(12) United States Patent
Renders

(10) Patent No.: US 9,061,704 B2
(45) Date of Patent: Jun. 23, 2015

(54) STEERING MECHANISM FOR A DRAWN VEHICLE TO STEER ONE OR MORE TURNABLE STEERED AXLES

(75) Inventor: Frans Renders, Ravels (BE)

(73) Assignee: NV X-DRIVE, Houthalen (BE)

( * ) Notice: Subject to any disclaimer, the term of this patent is extended or adjusted under 35 U.S.C. 154(b) by 0 days.

(21) Appl. No.: 13/824,906

(22) PCT Filed: Sep. 30, 2010

(86) PCT No.: PCT/IB2010/002477
§ 371 (c)(1),
(2), (4) Date: Mar. 18, 2013

(87) PCT Pub. No.: WO2012/038772
PCT Pub. Date: Mar. 29, 2012

(65) Prior Publication Data
US 2013/0175785 A1 Jul. 11, 2013

(30) Foreign Application Priority Data
Sep. 21, 2010 (BE) .................................. 2010/0562

(51) Int. Cl.
*B62D 13/02* (2006.01)
(52) U.S. Cl.
CPC .................................. *B62D 13/025* (2013.01)

(58) Field of Classification Search
CPC ...................................................... B62D 13/025
USPC ..................................... 280/426; 180/235, 428
See application file for complete search history.

(56) References Cited

U.S. PATENT DOCUMENTS

| 3,102,735 | A  | * | 9/1963 | Bigge | 280/81.1 |
| 3,168,332 | A  | * | 2/1965 | Eynon | 280/423.1 |
| 6,257,611 | B1 | * | 7/2001 | Muldoon | 280/442 |
| 8,459,672 | B1 | * | 6/2013 | Pollard, Sr. | 280/98 |

FOREIGN PATENT DOCUMENTS

| CH | 423 502 A | 10/1966 |
| DE | 20 2005 015 120 U | 12/2005 |
| GB | 2 390 348 A | 1/2004 |

* cited by examiner

*Primary Examiner* — Joseph Rocca
*Assistant Examiner* — Felicia L Brittman
(74) *Attorney, Agent, or Firm* — Sughrue Mion, PLLC

(57) ABSTRACT

A steering mechanism for a drawn vehicle to steer one or more turnable steered axles that at least has a slewing bearing, a rocker that is fitted around a vertical shaft and is turnable, a cable whose ends are connected to the rocker on either side of the vertical shaft and which is fitted around the slewing bearing to transmit a turn of the slewing bearing to the rocker and a tackle at each end of the cable with a fixed pulley that can be coupled to the drawn vehicle, and a movable pulley on the rocker.

22 Claims, 30 Drawing Sheets

STEERING MECHANISM FOR A DRAWN VEHICLE TO STEER ONE OR MORE TURNABLE STEERED AXLES

CROSS REFERENCE TO RELATED APPLICATIONS

This application is a National Stage of International Application No. PCT/IB2010/002477 filed Sep. 30, 2010, claiming priority based on Belgian Patent Application No. 2010/0562 filed Sep. 21, 2010, the contents of all of which are incorporated herein by reference in their entirety.

The present invention relates to a steering mechanism for a drawn vehicle to steer one or more turnable steered axles by the mutual bending movement between the drawn vehicle and the towing vehicle or tractor unit when taking a bend.

According to the state of the art there are already many steering mechanisms for steering turnable axles on a drawn vehicle.

More specifically, in the known steering mechanisms a first slewing bearing or cable sheave is generally turned in accordance with the turning or bending movement of a tractor unit with respect to the drawn vehicle, and is converted into a turn of a second cable sheave or slewing bearing that directly steers one or more steerable axles.

For the transmission and conversion of the aforementioned turning, one or more cables or rods are often used that couple the first and second slewing bearings or cable sheaves to one another.

The force required to steer the steered axles is thus developed by the relative bending movement between the tractor unit and the drawn vehicle when taking a bend, and in conventional semitrailers this force is limited in practice to around 10 tonnes.

A disadvantage of this is that only a limited number of steered axles can be steered and thus for drawn vehicles with a high load capacity, and thus with a large number of axles, only a limited number of axles can be made steerable, while the other axles are necessarily fixed or rigid axles.

The known drawn vehicles, as is known, have to contend with a large number of disadvantages.

A known disadvantage is, among others, that when taking a bend, the tyres twist and rub sideways on the road surface, especially the tyres on the non-controlled fixed axles.

As a result, the tyres wear relatively quickly, such that the lifetime of the tyres is limited to a maximum of 50,000 to 100,000 km.

The wearing of the tyres of course creates fine rubber dust from the tyres, which damages the environment. Moreover this ensures an enormous waste mountain of worn tyres for which so far there is no adequate waste processing or recycling.

Because of the twisting and rubbing of the tyres large sideways axial forces also occur on the axles that increase the temperature in the bearings and in the axle sets such that the grease in these components ages more quickly and these components must be inspected and maintained at regular points in time.

The twisting and rubbing also causes increased rolling resistance, such that the tractor unit must pull the drawn vehicle through the bend with a greater force, which in turn means greater fuel consumption and increased wear of the tyres of the tractor unit.

The phenomenon of twisting and rubbing is also coupled with a not insubstantial generation of noise when taking a bend.

A further significant disadvantage of the conventionally drawn vehicles is that of the blind spot. It is indeed known that when taking a bend a drawn vehicle can deviate to the inside or outside by up to 1.5 meters, which can present considerable hazards to people or things that are within the turning circle of the drawn vehicle, certainly when the tractor unit driver does not have a good view of the situation, which is often the case.

In order to somewhat limit the twisting and rubbing, in conventionally drawn vehicles the axles are placed relatively close to one another, at least as seen from the driving direction, which frequently ensures a non-ideal distribution of weight over the axles and the hazard of flipping over when braking suddenly.

For drawn vehicles with a larger loading capacity and a large number of steered axles, special and expensive constructions are generally used that are tailor-made according to the tonnage of the drawn vehicle.

Another disadvantage of known steering mechanisms is that their dimensions are often very large and they are relatively heavy, such that the useful load that can be carried is reduced and the construction of the steering mechanism on the drawn vehicle is thereby sometimes problematic.

In known steering mechanisms where the turning movement of the tractor unit with respect to the drawn vehicle is transmitted by means of a rod or rods, there is an additional disadvantage.

In such a case the angle through which the tractor unit can turn with respect to the drawn vehicle is limited by the rod or rods, for example just because the rod or rods is/are limited just by internal restrictions in the mechanics through their link to the steering slewing bearing.

Another disadvantage in such a case is that the rod or rods have a reverse effect on the axle or axles to be steered as soon as an angle of 90° between the tractor unit and the drawn vehicle is reached, which of course cannot be the intention.

The reason for this is that the angular displacement of the rod or rods increases until the aforementioned angle of 90° between the tractor unit and drawn vehicle is reached, after which the angular displacement of the rod or rods decreases again with any further turning of the tractor unit with respect to the drawn vehicle, insofar this is at all possible.

A further disadvantage of known steering mechanisms is that they cannot be used on drawn vehicles such as semitrailers with an extendable chassis with adjustable length, as the distance between the front slewing bearing with which the drawn vehicle is coupled to the tractor unit, and the axles of the extendable part is variable. In such cases steered axles necessarily have to be abandoned.

The purpose of the present invention is to provide a solution to the aforementioned disadvantages and any other disadvantages.

To this end the invention relates to a steering mechanism of a drawn vehicle to steer one or more turnable steered axles of the drawn vehicle, that at least has:

- A slewing bearing with a first slewing bearing part and a second slewing bearing part that can be turned with respect to one another, in which the first slewing bearing part can be coupled to the drawn vehicle and the second slewing bearing part can be coupled to a tractor unit.
- A control for steering the aforementioned axles consisting of a rocker and a support that can be coupled to the drawn vehicle, whereby the support contains at least a vertical shaft around which the rocker can be turned.
- A cable whose first end is connected to a first side of the rocker and whose second end is connected to a second side of the rocker, whereby the vertical axis of the control is located between the aforementioned first side and second side of the rocker, whereby an interjacent part of the cable is placed around the second bearing part to transmit the rotation of the second slewing bearing part to a rotation of the rocker; and, A tackle at each end of the cable, consisting of two or more pulleys, where at least one pulley of each tackle can be coupled to the drawn vehicle, hereinafter the fixed pulley, and a least one pulley of each tackle is on the rocker, hereinafter the movable pulley, and whereby a part of the cable between each end and the interjacent part of the cable is guided over the pulleys of the tackle concerned.

A first big advantage of such a steering mechanism according to the invention consists of the cable that transmits the movement of the slewing bearing to the rocker of the control being guided over two tackles, such that a much smaller force is required from the slewing bearing to turn the rocker and the axles coupled to it, compared to the transmission of force from the slewing bearing to the rocker by a cable that is not guided over such tackles.

With a steering mechanism according to the invention, with the same maximum available force on the slewing bearing a much greater force can be developed to turn the axles, compared to the known steering mechanisms in which no tackles are used. This means that for this maximum available force a greater number of steered axles can be steered at the same time, without extra sources of force than obtained by the relative movement between the tractor unit and the drawn vehicle when taking a bend.

With such a configuration, for example, forces of 40 tonnes or more can be transmitted.

Because a number of axles can be steered at the same time, the twisting and rubbing on the tyres will also be reduced and thus all the aforementioned disadvantages relating to this.

Thus for example the wear of the tyres will decrease substantially and the lifetime of the tyres, for both the drawn vehicle and the tractor unit, will increase substantially. Tests have shown that the tyres of the tractor unit can last for up to 500,000 km.

Less wear means less fine dust, less fuel consumption, less $CO_2$ emissions, and a smaller waste mountain of worn tyres, less noise and less maintenance.

As a result of the larger number of steered axles a smaller blind spot can be realised as the drawn vehicle can be steered better in the tracks of the tractor unit, which fosters safety.

Moreover, the axles can be mounted further apart from one another in the driving direction, such that there is a better distribution of weight and less risk of flipping over when braking suddenly.

By constructing the steering mechanism according to the invention with tackles that have more or less pulleys, the ratio between the force applied to the slewing bearing and the force exerted on the rocker can be changed or optimised relatively easily.

Another advantage of a steering mechanism according to the invention consists of the angular displacement between the tractor unit and the drawn vehicle not being limited anymore, such that in principle the tractor unit can be taken to a much larger angle with respect to the drawn vehicle.

Another great advantage of a steering mechanism according to the invention is that it can be constructed with limited dimensions and less weight compared to the known steering mechanisms for drawn vehicles.

To this end a construction unit according to the invention is preferably constructed in a simple way whereby the tackle of each end of the cable consists of only one movable and one fixed pulley, whereby the fixed pulleys are on either side of the slewing bearing and the movable pulleys on the rocker are between the end of the cable concerned and the vertical axis of the rocker, and whereby the cable is guided from one end over the fixed pulley to that end and then around the movable pulley of that end to the slewing bearing.

In this way a very compact embodiment is obtained of a steering mechanism according to the invention, in which large forces can also be developed with such a compact steering mechanism to drive heavily loaded axles, which could not be steered with the known steering mechanisms.

Preferably the steering mechanism is constructed as a built-on or built-in cassette or module that can be fitted as a whole under the drawn vehicle, and which to this end has a housing in which at least the slewing bearing and the control, as well as the tackles are placed.

Such a cassette can be universally and multifunctionally used for all types of drawn vehicles with a length of 6 m to 28 m, a tonnage of 10 to 60 tonnes, extendable drawn vehicles up to 30 m, also for low neck constructions, and both for semi-trailers and trailers, etc.

If the drawn vehicle has a number of steered axles, the steering mechanism will preferably be designed such that when taking a bend, the steered axles are steered such that the geometric axes of the wheels of the steered axles intersect one another at one point or approximately at one point.

In this way the steered axles nicely follow the tracks of the tractor unit, such that the tyres twist and rub on the road less and the blind spot also becomes smaller.

To better demonstrate the characteristics of the invention, a few preferred embodiments are described below, as an example without any limiting nature, of a steering mechanism according to the invention, with reference to the accompanying drawings, in which.

Figure 22:
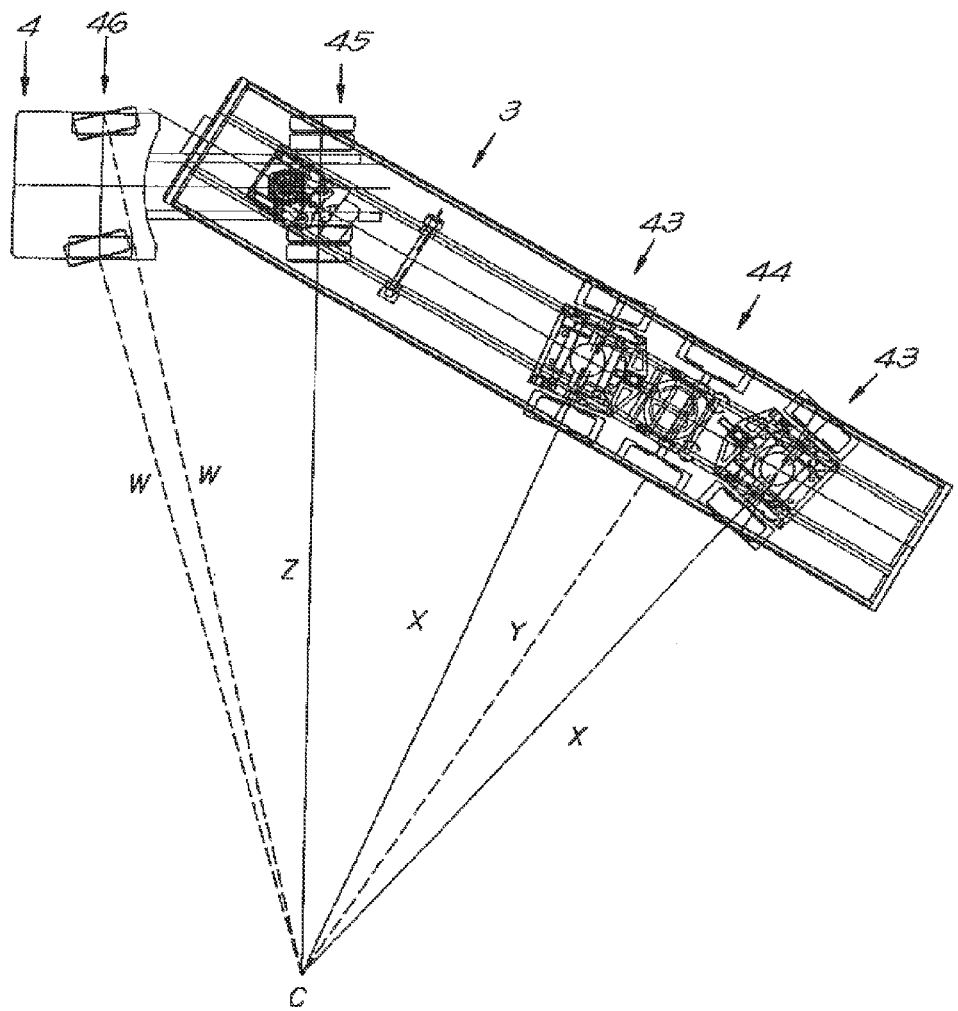

FIG. 22 gives a presentation of a preferred steering method of the axles of a drawn vehicle with a number of steered axles.

Figure 23:
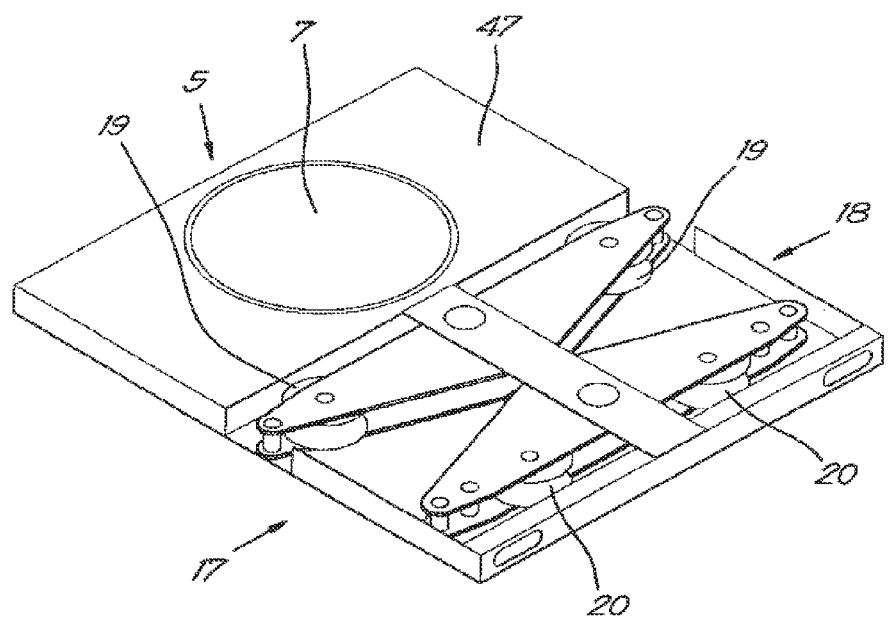
Figure 24:
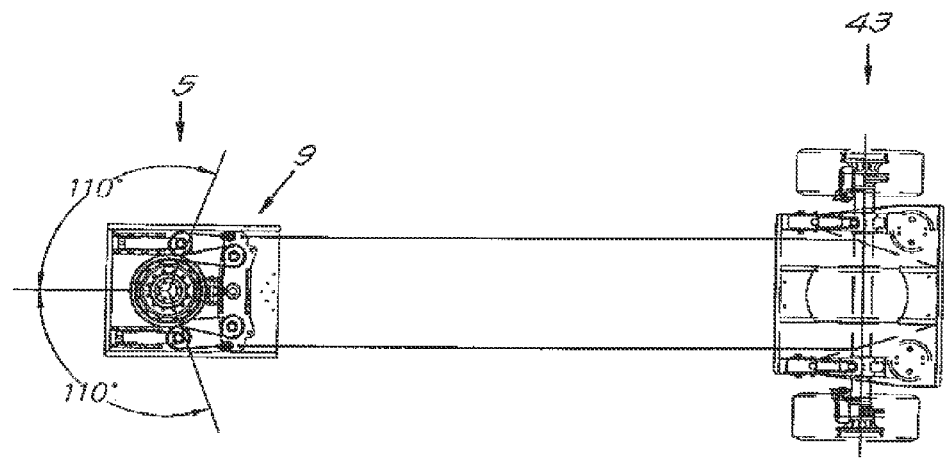
Figure 25:
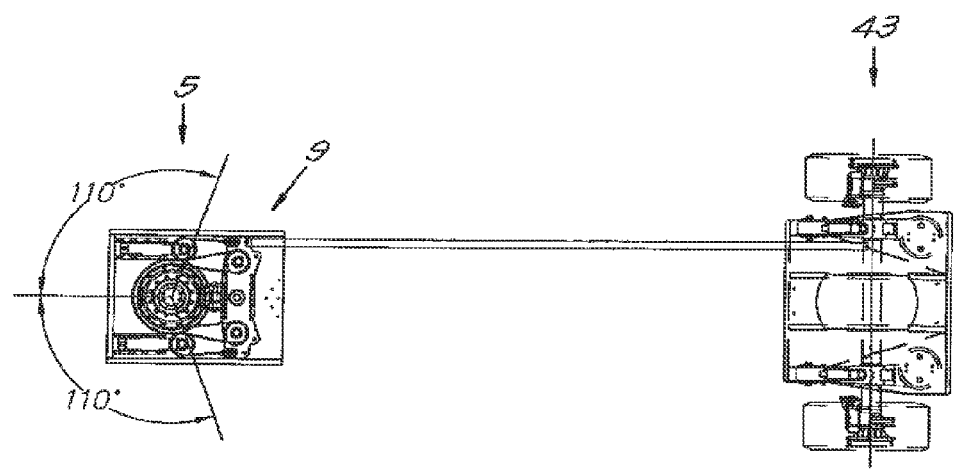
Figure 26:
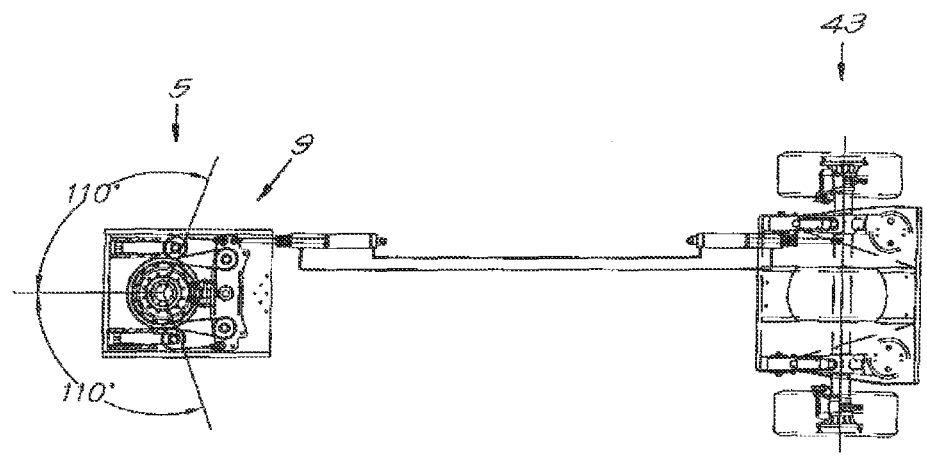
Figure 27:
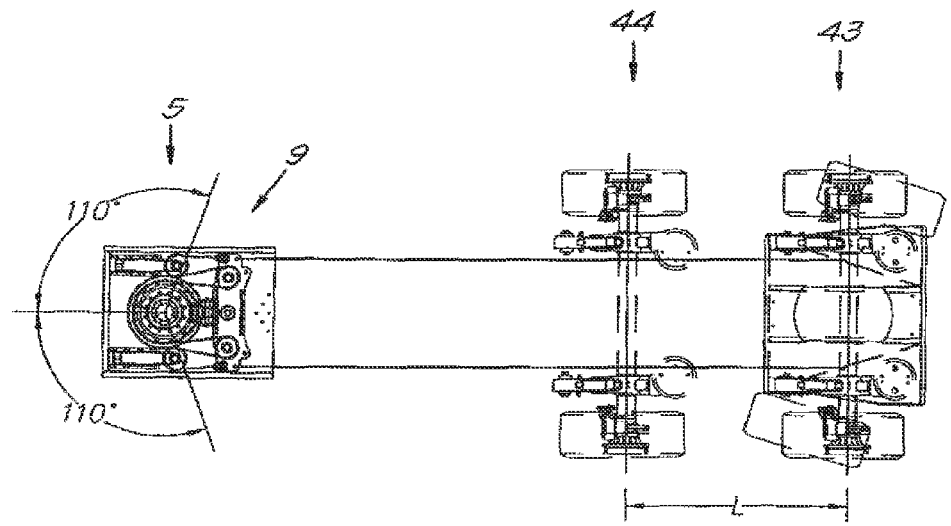
Figure 28:
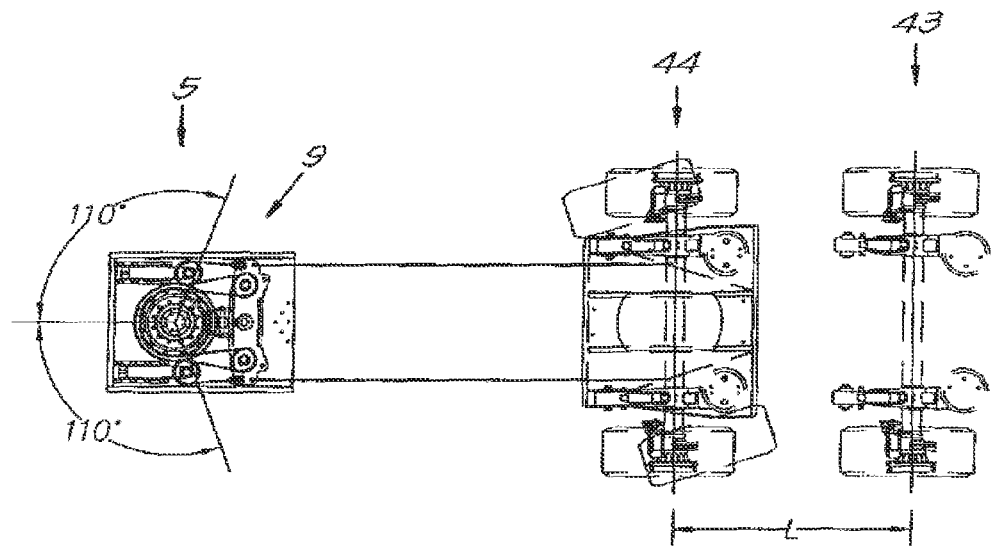
Figure 29:
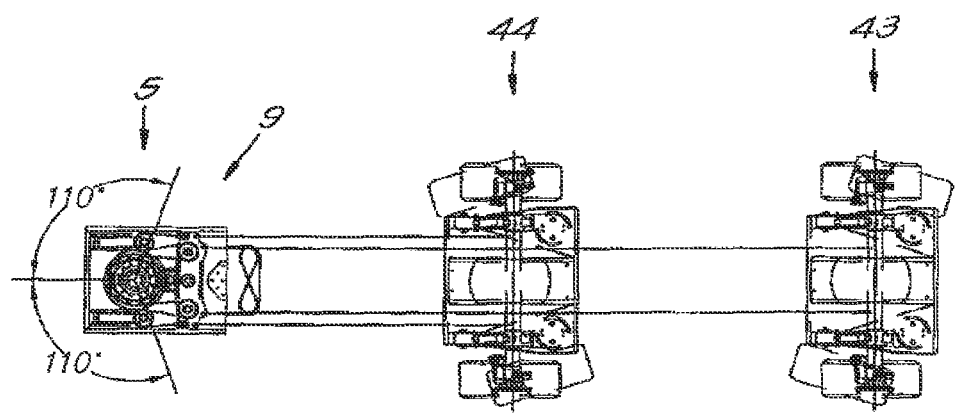
Figure 30:
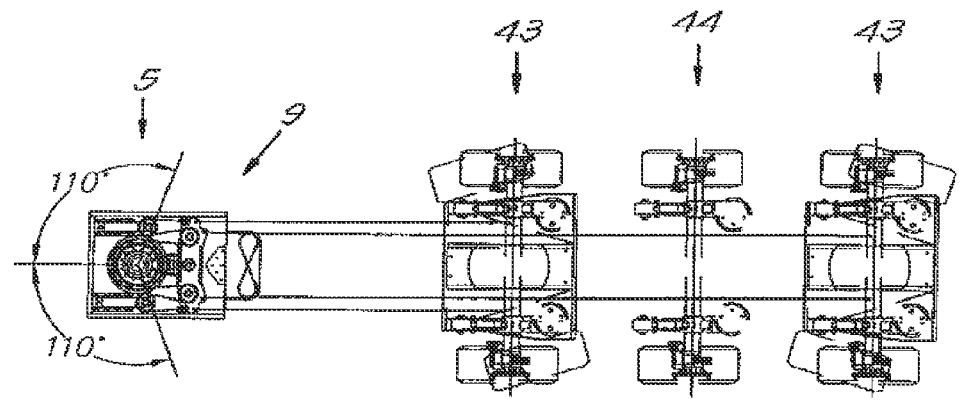
Figure 31:
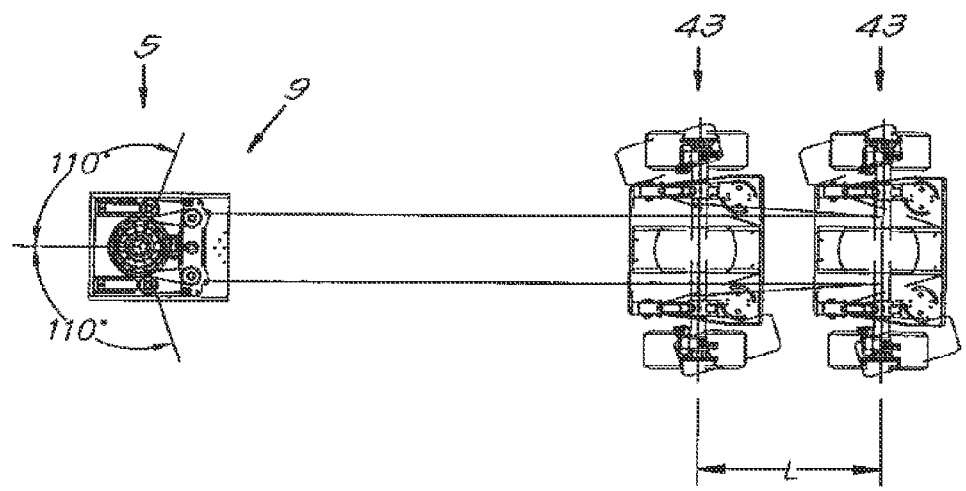
Figure 32:
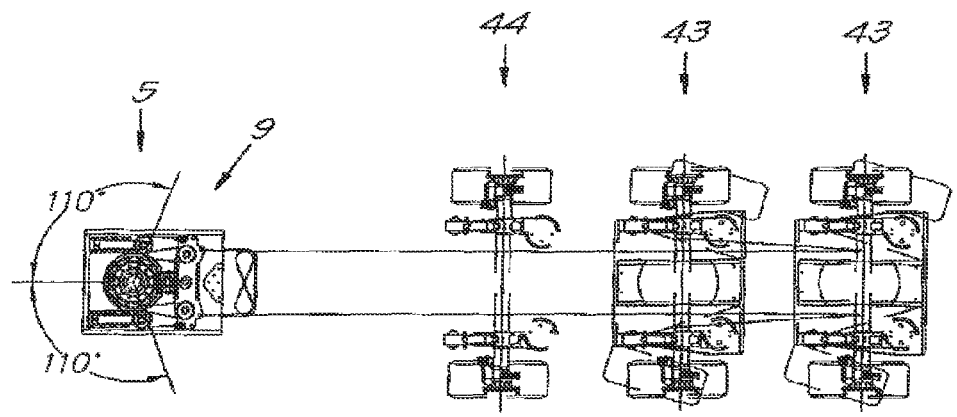
Figure 33:
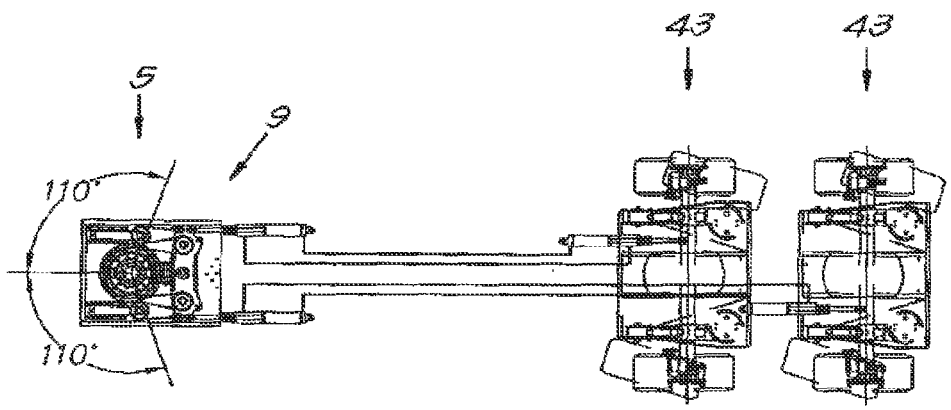
Figure 34:
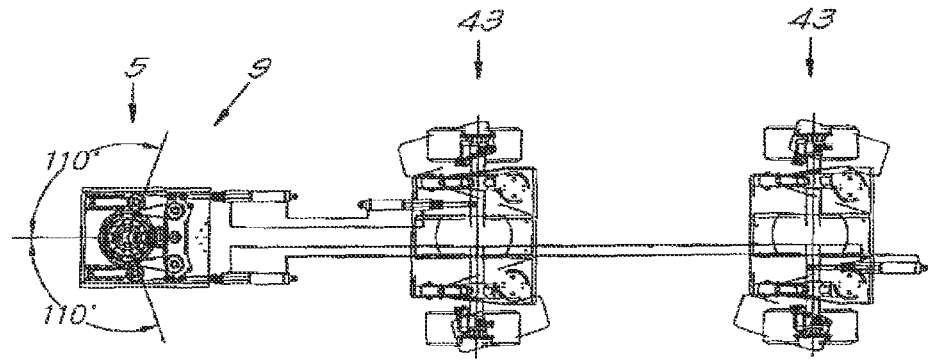
Figure 35:
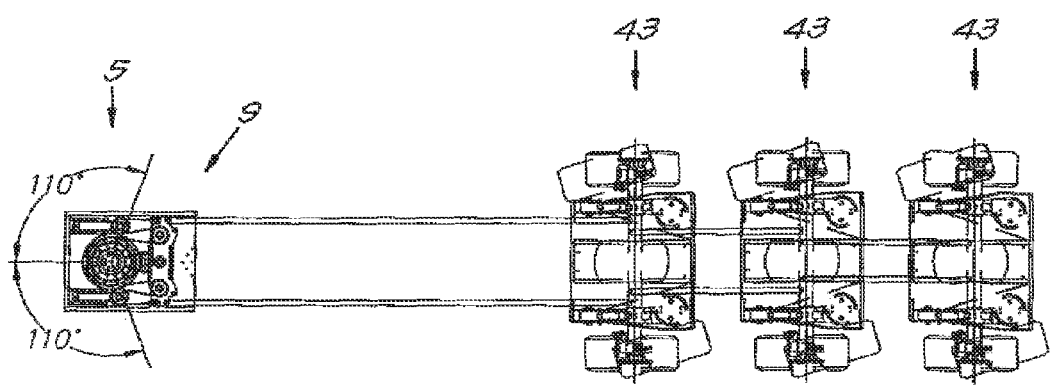
Figure 36:
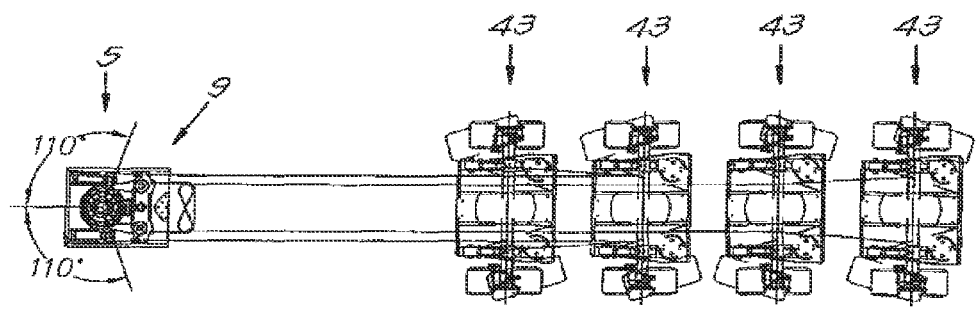
Figure 37:
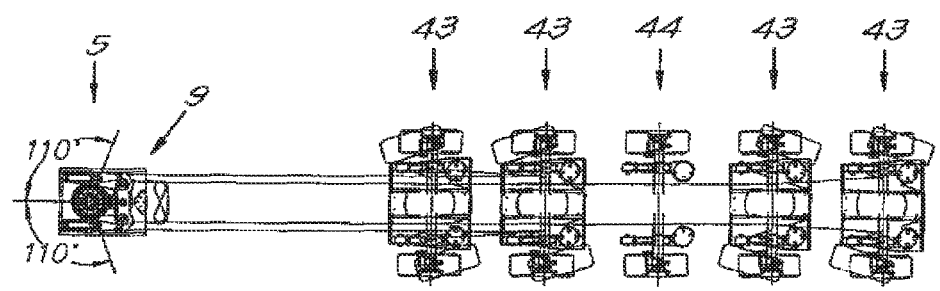

FIG. 23 shows in perspective a more practically developed embodiment of a steering mechanism according to the invention; and, FIGS. 24 to 37 show different possible applications of a steering mechanism according to the invention.

Figure 1:
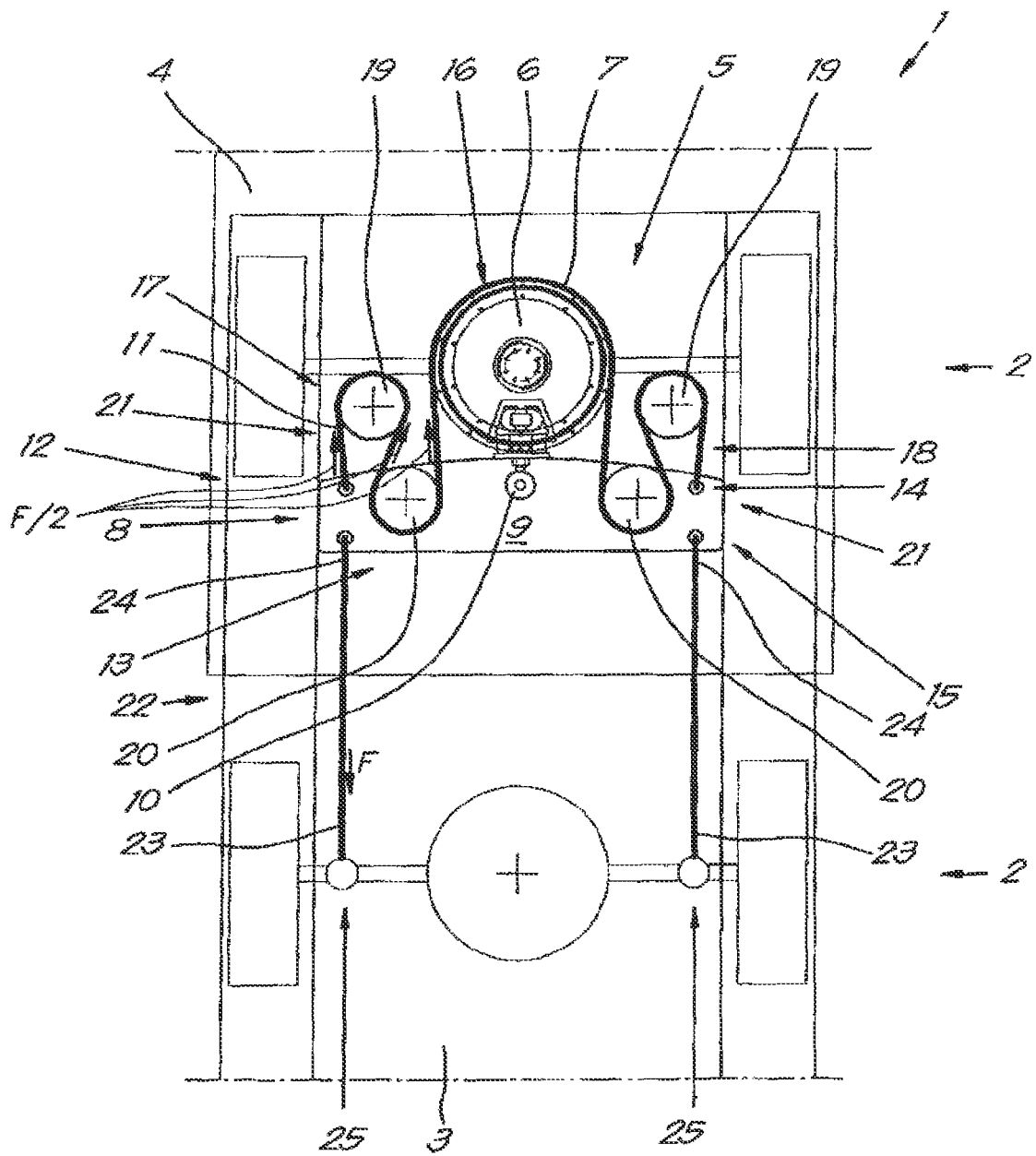
FIGS. 1 to 3 show the top view of a first possible embodiment of a steering mechanism according to the invention in different states, whereby the steering mechanism has a forward coupling mechanism for steering one single axle.
Figure 2:
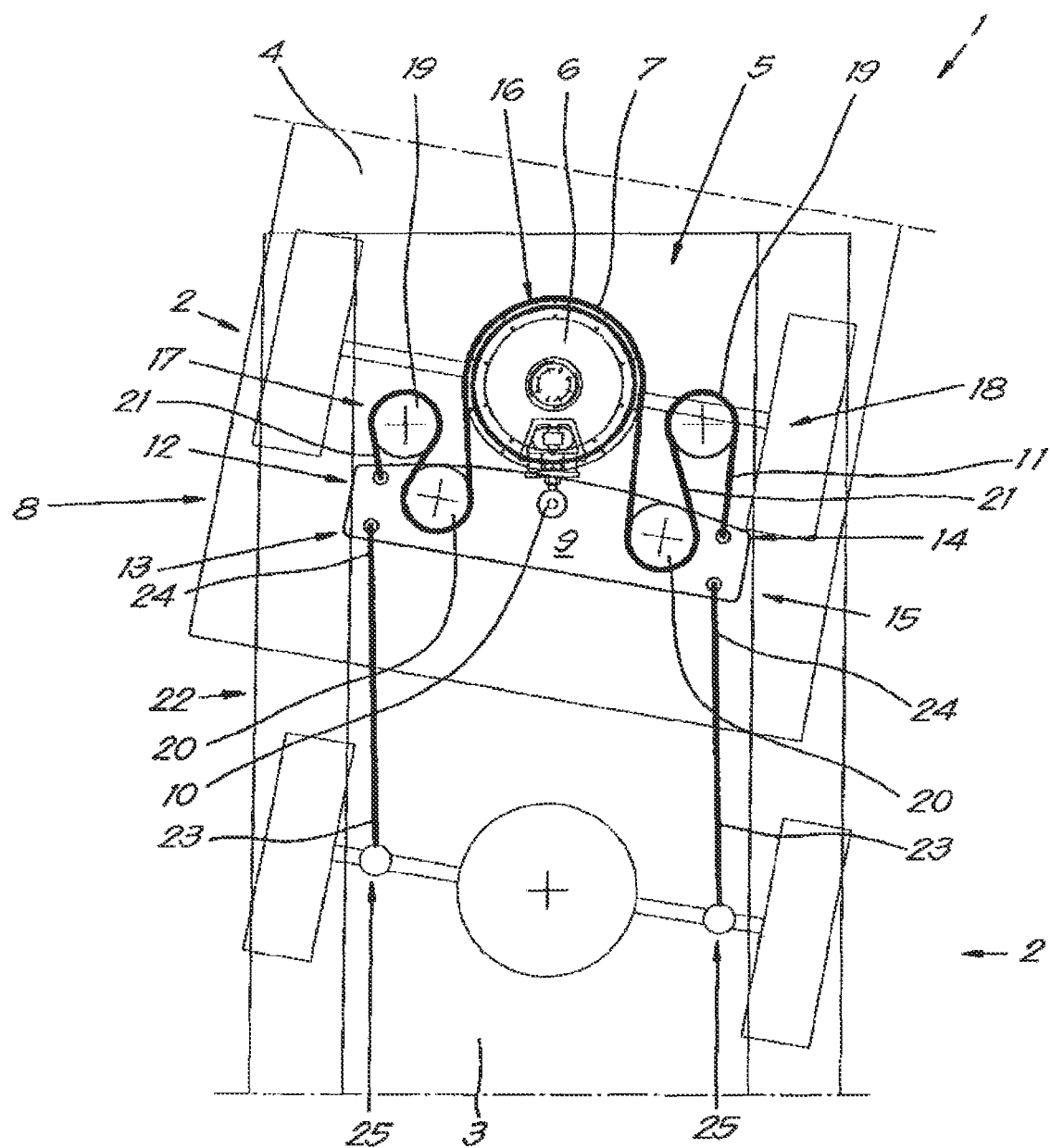
Figure 3:
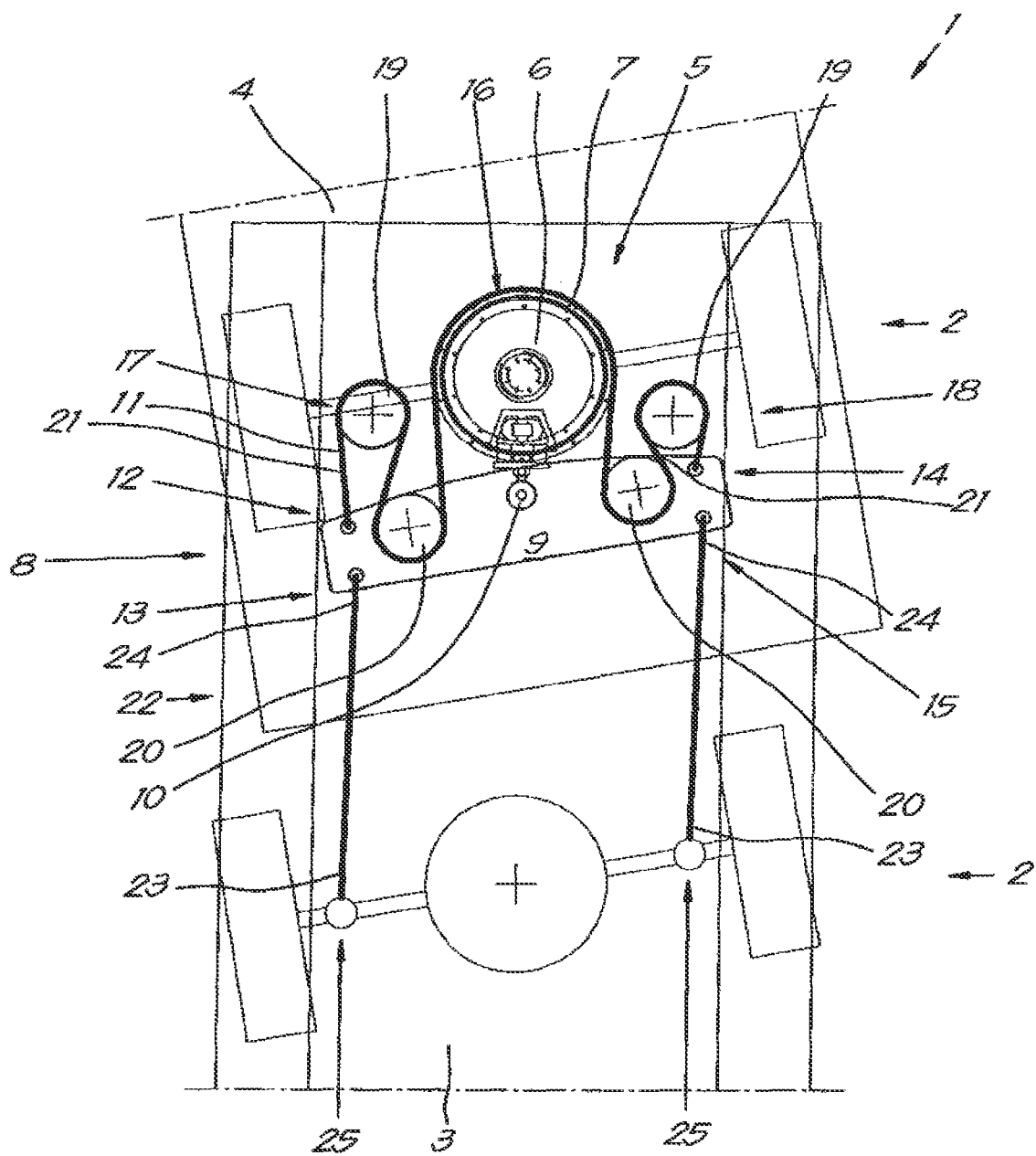

The steering mechanism 1 according to the invention shown in FIGS. 1 to 3 is in this case intended to steer one turnable steered axle 2 of a drawn vehicle 3, such as a semi-trailer or trailer or similar, whereby the drawn vehicle 3 is pulled by a tractor unit 4.

The steering mechanism 1 first and foremost contains a slewing bearing 5 with a first slewing bearing part 6 and a second slewing bearing part 7 that can turn with respect to one another.

The first slewing bearing part 6 can be coupled to the drawn vehicle 3 and the second slewing bearing part 7 can be coupled to the tractor unit 4.

The slewing bearing parts 6 and 7 are in this case actually secured to the drawn vehicle 3 and the tractor unit 4 respectively.

Typically the first slewing bearing part 6 will be affixed to the drawn vehicle 3 and this concentrically around a coupling part with which the drawn vehicle 3 is coupled to the tractor unit 4, typically such as a coupling part to the drawn vehicle 3 in the form of a kingpin.

Furthermore the steering mechanism 1 according to the invention contains a control 8 for steering the aforementioned axle 2.

This control 8 consists of a type of rocker 9 and a support 10 that can be coupled to the drawn vehicle 3.

The support 10 at least has a vertical shaft 10 around which the rocker is fixed and can be turned.

This vertical shaft 10 can for example be mounted or welded directly on the drawn vehicle 3, or can for example be placed on a mounting plate or housing which in turn can be coupled to the drawn vehicle 3.

The aim is that a turn of the tractor unit 4 with respect to the drawn vehicle 3, and which turn corresponds to a rotation of the second slewing bearing part 7 with respect to the first slewing bearing part 6, is transferred to this rocker 9 in order to control the turning of the axle 2 via the rocker 9.

To this end a cable 11 has its first end 12 connected to a first side 13 of the rocker 9 and its second end 14 connected to a second side 15 of the rocker 9.

Hereby the vertical shaft 10 of the control 8 is located between the aforementioned first side 13 and second side 15 of the rocker 9.

Furthermore an interjacent part 16 of the cable 11 is affixed around the second slewing bearing part 7 to transmit the rotation of the second slewing bearing part 7 to a rotation of the rocker 9.

The cable 11 can for example be affixed in a circular cable duct around the circumference of the second slewing bearing part 7, and for example can be clamped in a certain place in this cable duct using clamping means in order to avoid the sliding of the cable 11 in the cable duct, even though this is not necessary according to the invention.

More important for the invention is that at each end 12 and 14 of the cable 11 there is a tackle, tackle 17 and tackle 18 respectively.

In this case each tackle 17 and 18 consists of a pair of pulleys, more specifically a first pulley 19 and a second pulley 20.

The first pulley 19 of each pair of pulleys is placed rotatably around a vertical shaft that is securely mounted to the drawn vehicle 3.

Hereinafter, these pulleys 19 will be termed the fixed pulleys 19.

The fixed pulleys 19 are placed on either side of the slewing bearing 5.

The second pulley 20 of each pair is rotatably mounted on the rocker 9, more specifically on the side 13 or 14 respectively of the rocker 9 in accordance with the end 12 and 14 respectively of the cable 11, with the tackle 17 or 18 respectively to which the pulley 20 belongs.

Hereinafter, these pulleys 20 will be termed the movable pulleys 20.

These movable pulleys 20 are moreover placed on the rocker 9 between the end 12 or 14 concerned of the cable 11 and the vertical shaft 10 of the rocker 9.

A part 21 of the cable 11 between each end 12 and 14 and the interjacent part 16 of the cable 11 is guided over the pulleys 19 and 20 of the corresponding tackle, tackle 17 and 18 respectively.

More specifically the parts 21 of the cable 11 are guided from the end 12 or the end 14 respectively, over the fixed pulley 19 of that end 12 or 14 respectively, and then around the movable pulley 20 of that end 12 or 14 respectively to the slewing bearing 5.

Another important aspect of the invention consists of the steering mechanism 1 having coupling means 22 to transmit a turn of the rocker 9 to a turn of one or more turnable steered axles 2, in this case one axle 2.

In the embodiment of a steering mechanism 1 according to the invention discussed here, as shown in FIGS. 1 to 3, the aforementioned coupling means 22 consist of a direct mechanical coupling from the control 8 to the turnable steered axle 2 by means of a pair of cables 23 or chains, that are each secured to the rocker at one end 24 and the other end 25 to the turnable steered axle 2 concerned.

As an alternative to cables or chains 23, one or more rods or similar can be used just as well.

An important advantage of a steering mechanism 1 according to the invention arises from the use of the tackles 17 and 18, and in this case can be understood as follows.

If the tackle 17 is considered separately and it is further presumed that a certain force F is required on the side 12 of the rocker 9 to turn the rocker 9, for example because the axle 2 generates a resistance F to such turning, then the driving force supplied by the slewing bearing 5 needed to turn the rocker 9 is only half F/2 of the force F needed at the level of the rocker 9.

After all the rocker 9 can only be turned in the direction of the fixed pulley 19 by bringing the pulleys 19 and 20 closer together, whereby the resistance F to be overcome on the rocker 9 is divided between two cable parts, i.e. the part of the cable 11 between the end 12 and the pulley 19 and the part of the cable 11 between the pulley 19 and the pulley 20, such that it is sufficient to develop a tension in these cable parts equal to half of the force of resistance F/2 to overcome the full force of resistance F at the level of the rocker.

Such a tension is indeed obtained by developing a tensile force with the slewing bearing 5 in the interjacent part 16, equal to half of the force of resistance F/2.

In brief, it is sufficient to develop only a small force at the slewing bearing 5 to overcome a large resistance at the axle 2.

The big advantage of a steering mechanism 1 according to the invention immediately becomes clear from this, i.e. that it is highly suitable for steering axles 2 that are heavily loaded or for simultaneously steering a number of steered axles.

Moreover it is also clear that the steering mechanism 1 can be constructed very compactly, certainly compared to known steering mechanisms that have to steer the same heavily loaded axles 2.

In the embodiment shown in FIGS. 1 to 3 the coupling means 22 are constructed in the form of a forward coupling mechanism, such that when the rocker 9 turns in a certain direction, the turnable steered axle 2 coupled to this rocker 9 undergoes a turn in the same direction.

To this end the cables 23 on the side 13 and side 15 respectively of the rocker 9 are coupled to the corresponding sides of the axle 2, such that the cables 23 are parallel or practically parallel to one another.

FIG. 2 illustrates that when the tractor unit 4 turns with respect to the drawn vehicle 3 to make a right-hand turn, the rocker 9 and the axle 2 undergo a turn in the same direction.

FIG. 3 shows the situation when the tractor unit 4 and the drawn vehicle 3 are turned with respect to one another to make a left-hand turn, whereby again the rocker 9 and the axle 2 undergo a turn in the same direction.

Analogous to FIGS. 1 to 3, FIGS. 4 to 6 show a different embodiment of a steering mechanism 1 according to the invention.

In this embodiment the control 8 and the slewing bearing 5 are constructed identically.

The difference lies in the fact that the drawn vehicle 3 has two turnable steered axles 2, and that the coupling means 22 between the rocker 9 and these axles 2 are constructed differently.

Here the front axle 2 is coupled to the rocker according to a forward coupling mechanism, just as in the embodiment of FIGS. 1 to 3 whereby parallel cables 23 are provided on either side of the front axle 2 in order to steer it.

Figure 5:
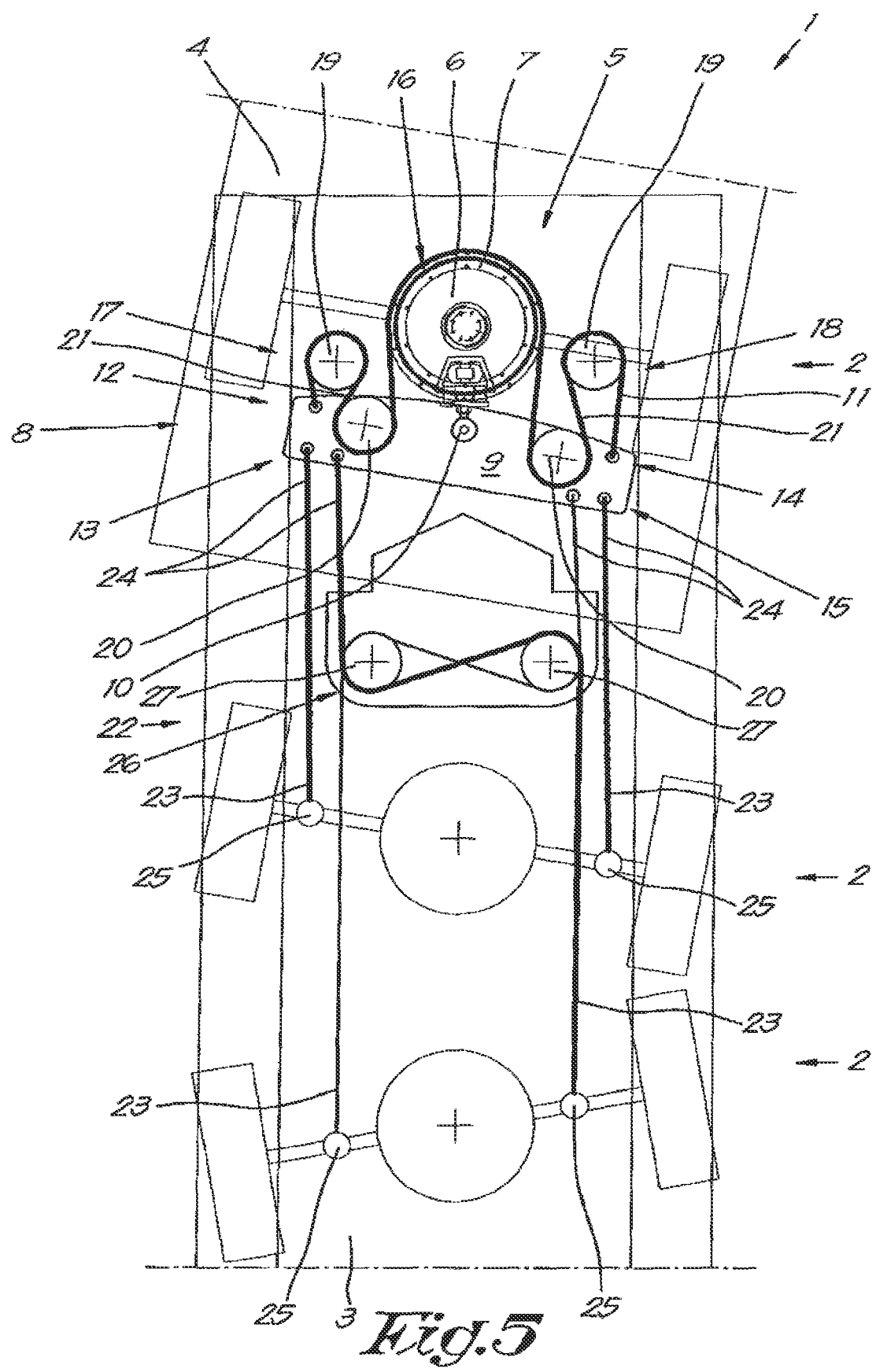
Figure 6:
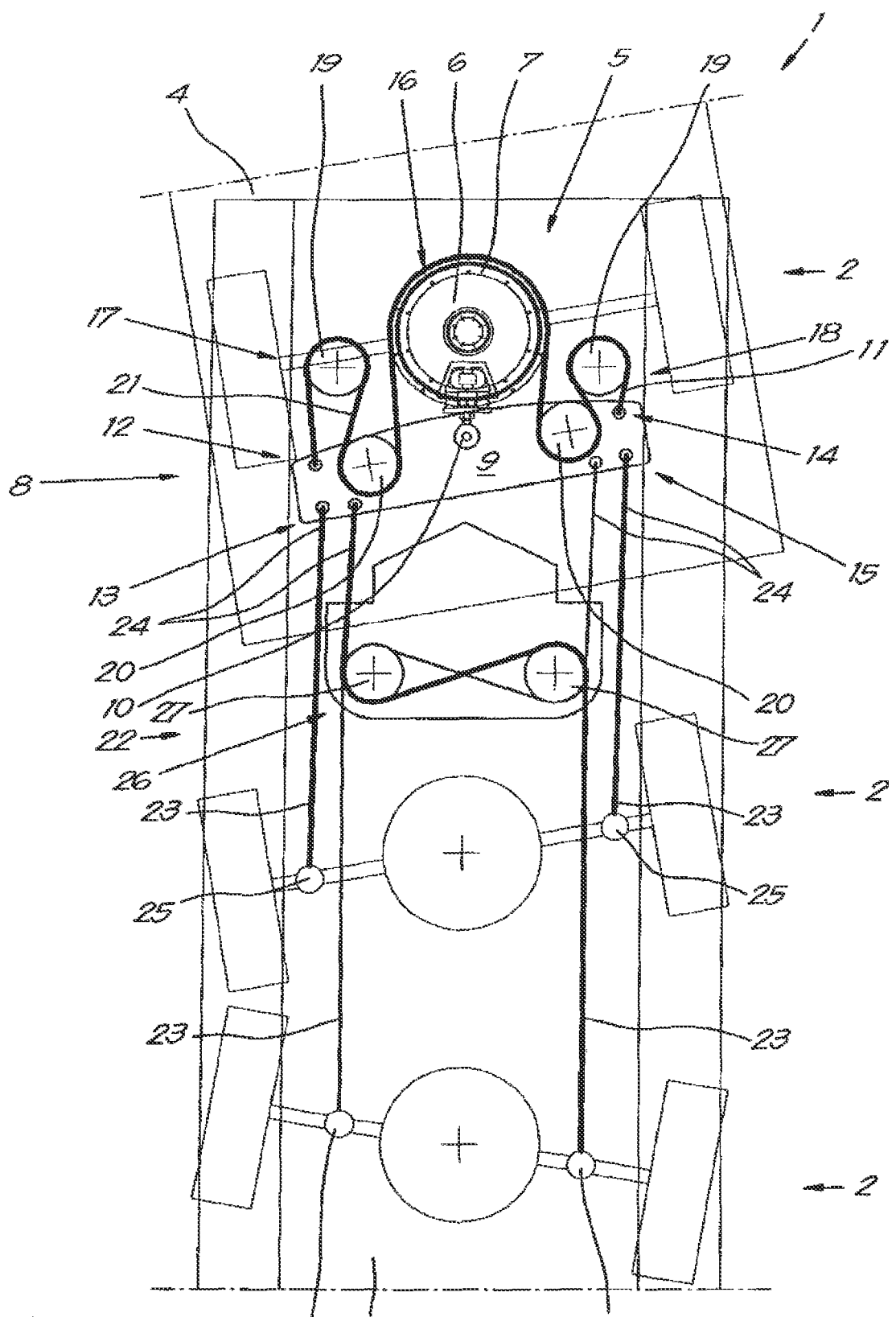

Just as in the previous case, a turn of the rocker 9 in a certain direction also results in a turn of the front axle 2 in the same direction, which is illustrated in FIGS. 5 and 6, when making a right-hand turn and a left-hand turn respectively.

On the other hand, the means of coupling 22 between the rearmost axle 2 and the rocker 9 have a reverse mechanism 26, such that when the rocker 9 turns in a certain direction the rearmost axle 2 undergoes a turn in the opposite direction to the aforementioned turning direction of the rocker 9.

The aforementioned reverse mechanism 26 in this case contains at least two turnable cable sheaves 27 that are positioned parallel to one another at some distance behind the rocker 9.

Moreover the rearmost axle 2 is coupled to the rocker 9 by means of cables 23, whereby this time these cables 23 are guided around the cable sheaves 27 such that the cables 23 are mutually crossed.

To this end, the cable sheaves 27 preferably have a double cable duct for incorporating a pair of cables 23.

Hereby each cable 23 starts from one of the sides 12 or 14 of the rocker 9 to a first cable sheave 27 on the corresponding side of the drawn vehicle 3, after which the cable 23 is partially guided around this cable sheave 27 up to an oblique direction and somewhat back to the rocker 9 in order to be guided around the other cable sheave 27 to a part of the rearmost axle 2 on the side of the drawn vehicle 3 opposite the aforementioned corresponding side.

Thus both cables 23 are crossed, which of course results in a control where the rear axle 2 turns in the opposite direction with respect to the turning direction of the rocker 9.

Of course such a steering mechanism 1 in which one or more axles 2 are steered according to a forward coupling mechanism, while one or more other axles 2 are steered in the opposite way with a reverse mechanism, is interesting to make the position of the wheels on the axles 2 correspond as closely as possible to the bend to be followed.

Figure 7:
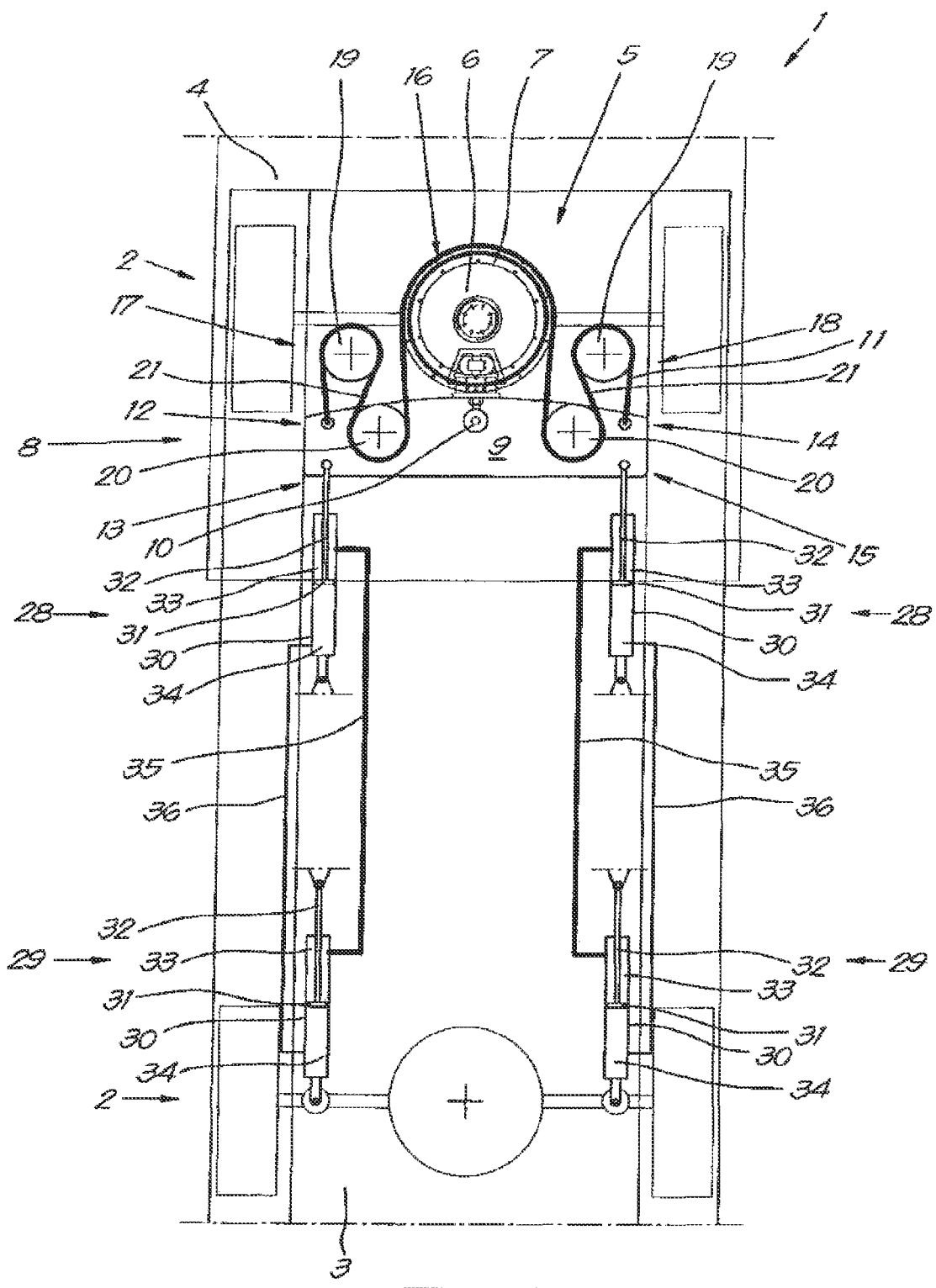
FIGS. 7 to 9 show, in a similar way to FIGS. 1 to 3, another embodiment of a steering mechanism according to the invention in different states, whereby the steering mechanism has a forward coupling mechanism for steering a single axle, but this time done with hydraulic means of coupling.
Figure 8:
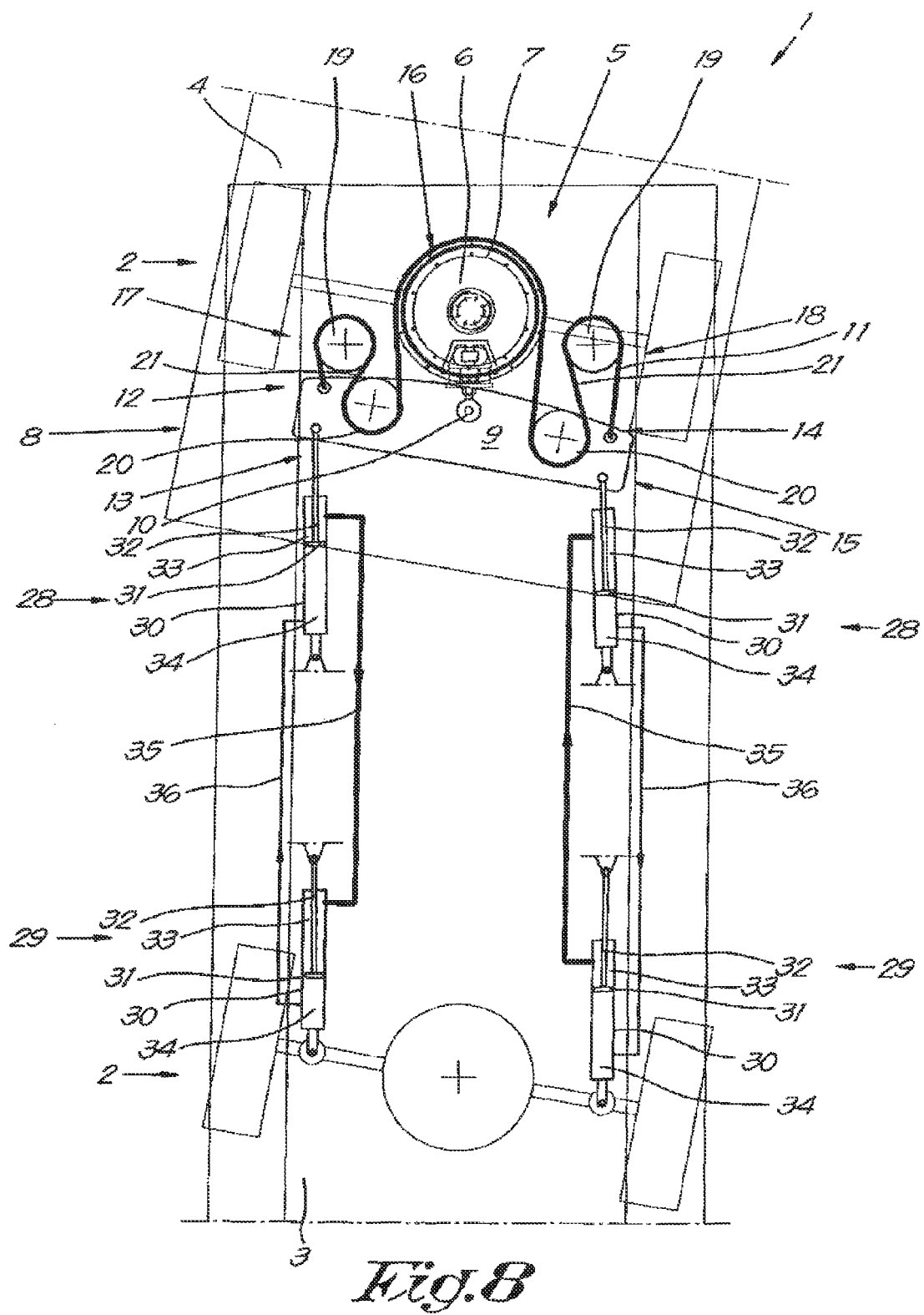
Figure 9:
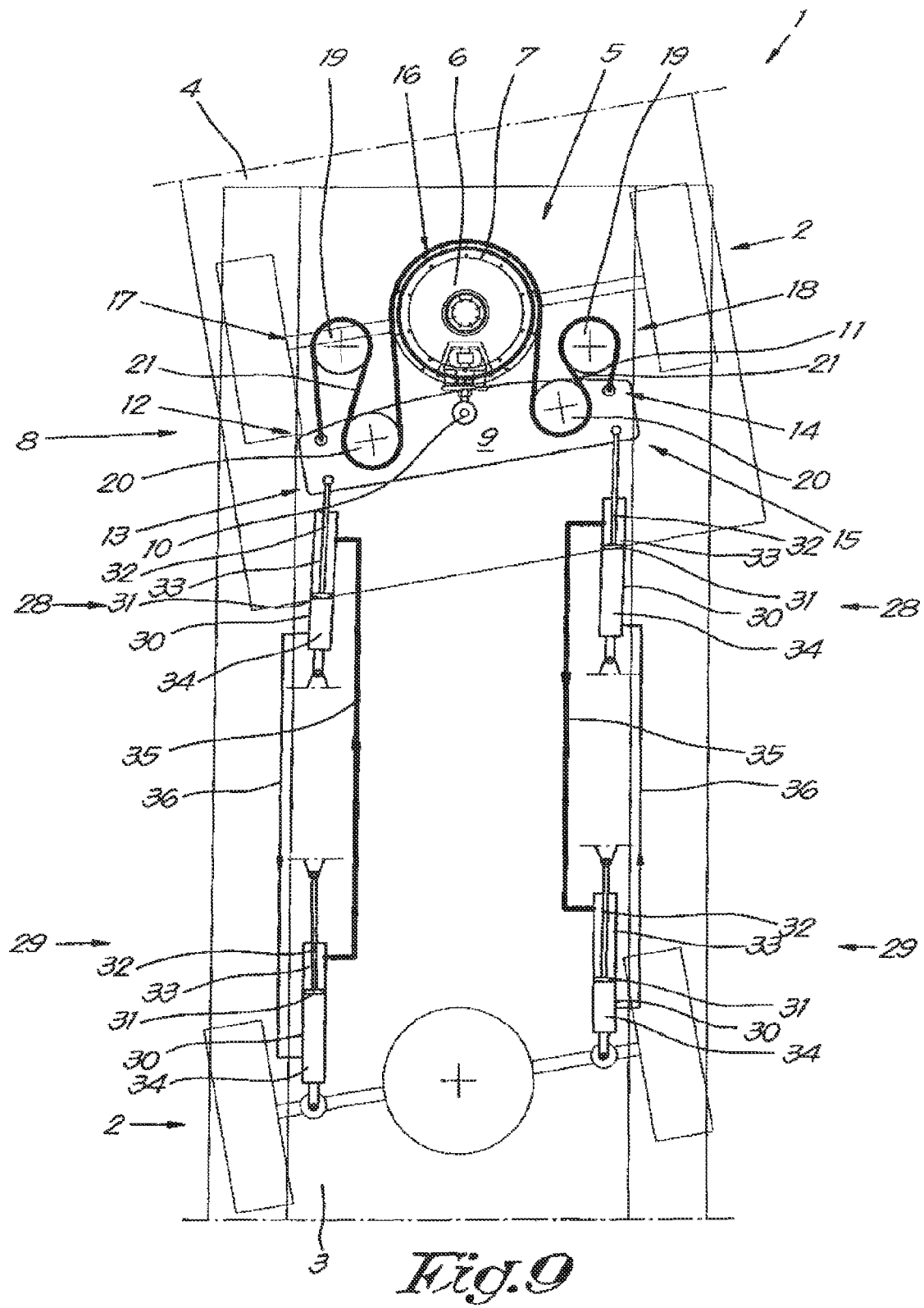

FIGS. 7 to 9 show a further embodiment of a steering mechanism 1 according to the invention, whereby the coupling means 22 are this time hydraulic means of coupling.

More specifically the hydraulic means of coupling 22 comprise a pair of driving double-acting cylinders 28 that are mounted on either side of the rocker 9 between this rocker 9 and the drawn vehicle 3.

Moreover, there are a pair of driven double-acting cylinders 29 that are each driven separately by one of the aforementioned driving double-acting cylinders 28, and which are mounted between the turnable steered axle 2 and the drawn vehicle 3.

Each double-acting cylinder 28 and 29 has a cylinder shaped housing 30 in which a piston 31 with piston rod 32 can be moved back and forth.

Hereby the pistons 30 divide the cylinders 28 and 29 into two parts, more specifically a first chamber 33 in which the piston rod 32 is also located, which however is sealed by means of appropriate seals, and a second chamber 34 that is only demarcated by the cylinder shaped housing 30 and the piston 31 itself.

In the embodiment shown in FIGS. 7 to 9, the piston rods 32 of the driving double-acting cylinders 28 are connected to the rocker 9, while their cylinder shaped housings 30 are connected to the chassis of the drawn vehicle 3.

Moreover the cylinder shaped housing 30 of the driven double-acting cylinders 29 is secured to the axle 2 to be steered, while the piston rods 32 are secured to the chassis of the drawn vehicle 3.

However, this is not essential and many other possible embodiments in which the cylinders 28 and 29 are reversed and such, are not ruled out according to the invention.

In order to obtain a real coupling between the rocker 9 and the axle 2 by means of the hydraulic cylinders 28 and 29, further hydraulic pipes are placed between the cylinders 28 and 29.

Hereby a first hydraulic pipe 35 is placed between the first chamber 33 of a driving double-acting cylinder 28 and the first chamber 33 of the corresponding driven double-acting cylinder 29.

Moreover, there is a second hydraulic pipe 36 between the second chamber 34 of the driving double-acting cylinder 28 and the second chamber 34 of the corresponding driven double-acting cylinder 29.

In this way the first chambers 33 and the second chambers of a driving cylinder 28 and the accompanying driven cylinder 29 are connected to one another and these connected chambers 33 or 34 form as it were a closed set in which a given volume of fluid, such as oil for example, is contained.

The action of such hydraulic means of coupling 22 is simple and as follows.

When making a right-hand turn for example, the tractor unit 4 undergoes a turn with respect to the drawn vehicle 3 in the clockwise direction, such as shown in FIG. 8, whereby a turn of the second slewing bearing part 7 with respect to the first slewing bearing part 6 also results in a turn of the rocker 9 in the clockwise direction.

Such a turn of the rocker 9 in the clockwise direction is only possible if the piston rod 32 of the driving cylinder 28 on the left-hand side of the drawn vehicle 3 moves out of the cylinder shaped housing 30, while the piston rod 32 of the driving cylinder 28 on the right side of the drawn vehicle 3 moves into the cylinder shaped housing 30.

Such movements of the piston rods 32 are inevitably accompanied by a flow of oil into or out of the chambers 33 and 34.

More specifically in the left driving cylinder 28 the first chamber 33 will become smaller and thus oil will flow out of this first chamber 33 to the first chamber 33 of the left driven cylinder 29 of the axle 2, and which first chamber 33 necessarily has to increase in volume, such that in this case the piston rod 32 of the left driven cylinder 29 is moved into the cylinder shaped housing 30.

This movement of the piston rod 32 of the left driven cylinder 29 is accompanied by a turn of the axle 2, more specifically also in the clockwise direction, as shown in FIG. 8.

Moreover, at the same time the volume of the second chamber 34 of the left driven cylinder 29 decreases and oil under the pressure of the piston 30 is pushed out of this second chamber 34 to the second chamber 34 of the left driving cylinder 28, and which second chamber 34 increases in volume according to the volume decrease of the first chamber 33 of this left driving cylinder 28.

In a completely analogous way there is an oil flow in the right driving cylinder 28, whereby oil flows out of the second chamber 34 from this right driving cylinder 28 to the second chamber 34 of the right driven cylinder 29, and thus the piston rod 32 of the right driven cylinder 29 moves outwards, which again results in a turn in the clockwise direction of the axle 2.

The direction of the oil flow is also shown in FIG. 8, and analogously in FIG. 9 the situation is shown when making a left turn.

It is clear that the configuration in the embodiment of FIGS. 7 to 9 results in a forward coupling mechanism that consists of the hydraulic pipes 35 and 36 between each driving double-acting cylinder 28 and the corresponding driven double-acting cylinder 29, such that the chambers 33 and 34 concerned are connected and the double-acting cylinders 28 and 29 are positioned such that a turn of the rocker 9 results in a turn of the axle 2 in the same direction.

In brief, in the embodiment of the steering mechanism 1 in accordance with the invention, shown in FIGS. 7 to 9, a similar result is obtained as with the embodiment shown in FIGS. 1 to 3.

However the last embodiment has the advantage that by using hydraulic means of coupling 22 large forces can be developed much more easily, whereby this last configuration can also be more easily adjusted to different types of drawn vehicles 3, and used in drawn vehicles 3 of adjustable lengths.

After all, the hydraulic pipes 35 and 36 can easily be provided in all kinds of forms and lengths, while for coupling a rocker 9 to an axle 2 using cables 23 or rods or similar, there can be no obstructions between the rocker 9 and the axle 2 to be steered, which can be problematic in many cases and even impossible for drawn vehicles 3 with adjustable lengths.

Figure 10:
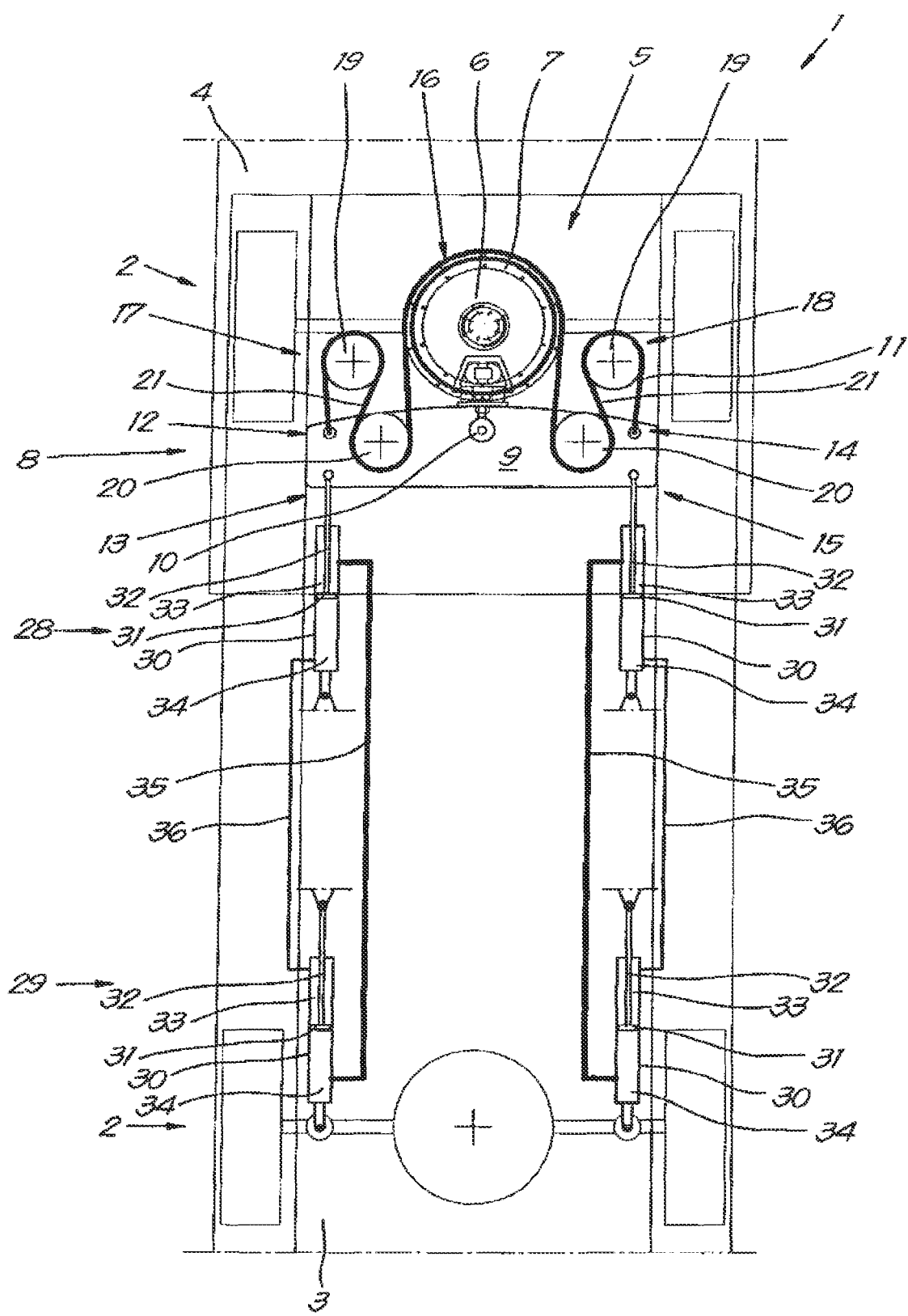
FIGS. 10 to 12 show, in a similar way to FIGS. 7 to 9, another embodiment of a steering mechanism according to the invention in different states, each time with hydraulic means of coupling but this time constructed in the form of a reverse mechanism for the reverse steering of one axle.
Figure 11:
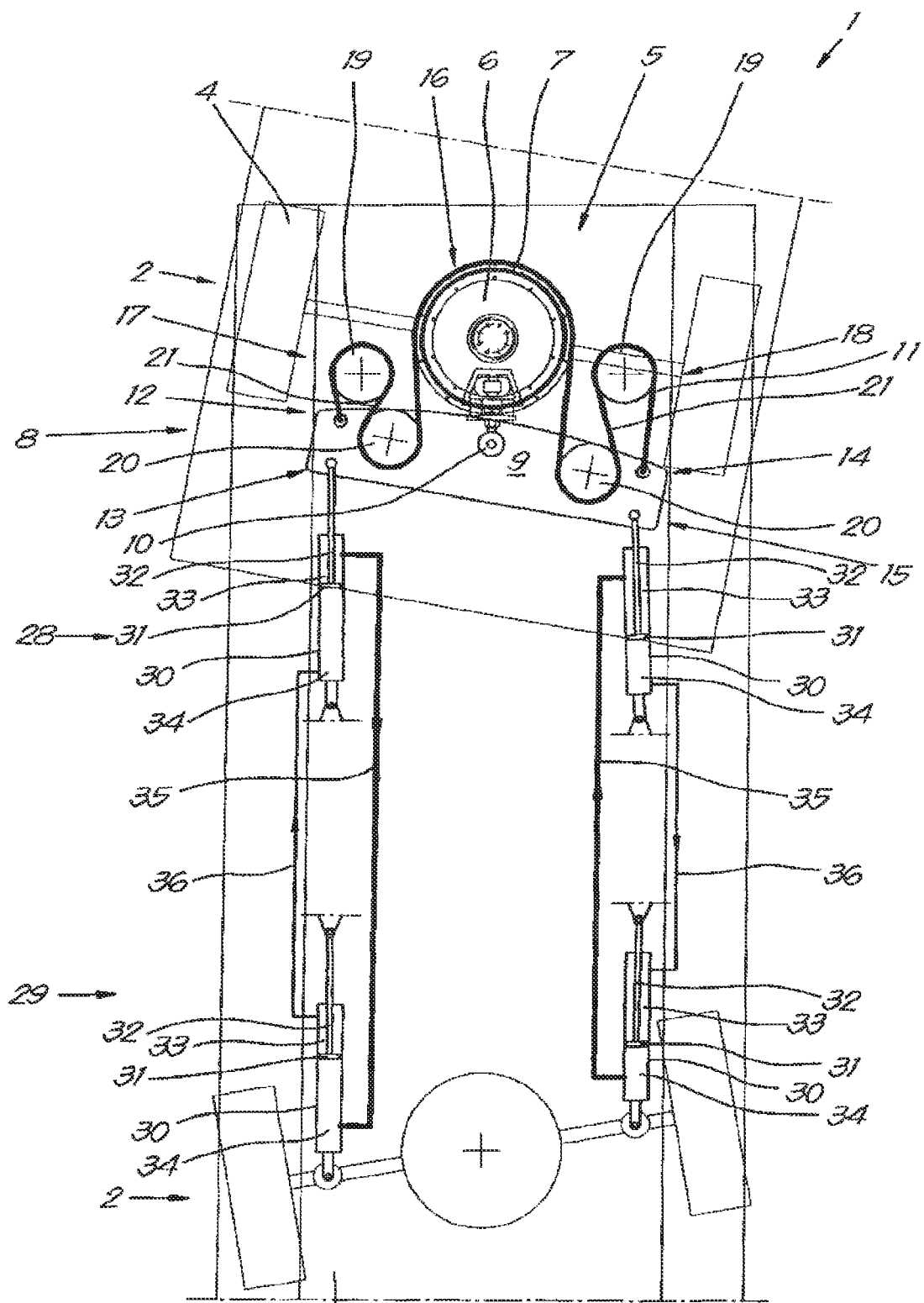
Figure 12:
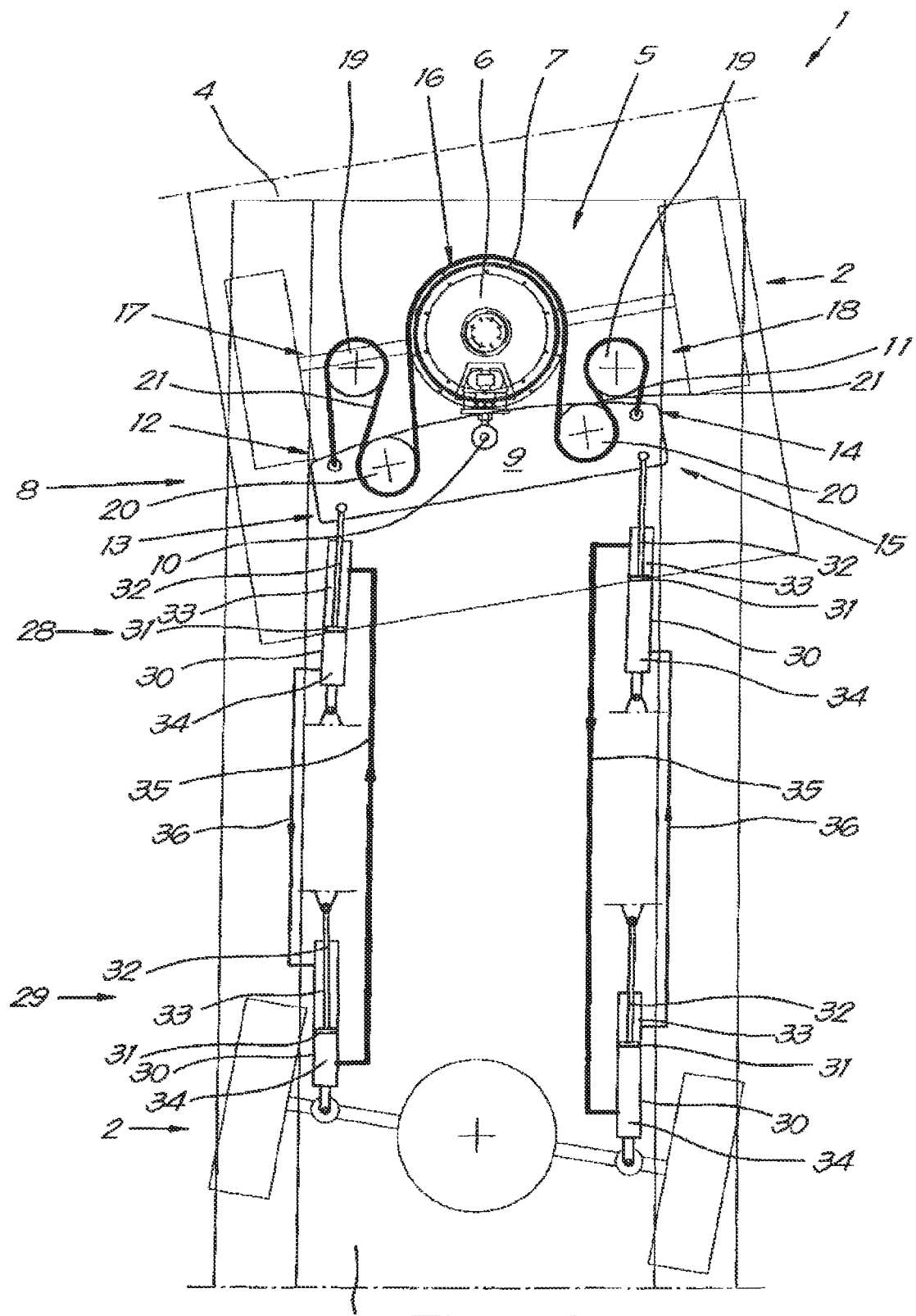

FIGS. 10 to 12 show a further embodiment of a steering mechanism 1 according to the invention that also has hydraulic means of coupling 22 for steering only one single axle 2, however this time the hydraulic means of coupling 22 are configured as a reverse mechanism that consists of the hydraulic pipes 35 and 36 between each driving double-acting cylinder 28 and the accompanying driven double-acting cylinder 29, such that the chambers 33 and 34 concerned are connected and the cylinders 28 and 29 are positioned such that a turn of the rocker 9 results in a turn of the axle 2 in the opposite direction.

In this case, in contrast to what was the case in the previous embodiment, to this end the first chamber 33 of each driving cylinder 28 is connected to the second chamber of the accompanying driven cylinder 29 by means of a hydraulic pipe 35.

Furthermore, the second chamber 34 of each driving cylinder 28 is connected to the first chamber 33 of the accompanying driven cylinder 29 by means of a hydraulic pipe 36.

Moreover, the driven double-acting cylinders 29 are still positioned as in the previous embodiment, whereby the piston rods 32 of the cylinders 29 are coupled to the axle 2, while the cylinder shaped housings 30 of them are secured to the chassis of the drawn vehicle 3.

The action of the steering mechanism 1 is completely analogous to that of the previous embodiment, but due to the aforementioned reverse coupling between the chambers 33 and 34, the oil flow between the chambers 33 and 34 results in an opposite movement of the rocker 9 and the steered axle 2.

As there is a volume difference between the first chambers and second chambers 34 of the cylinders 28 and 29 concerned, it is preferable to ensure that accumulators are provided in the hydraulic pipes 35 and 36 that accommodate this volume difference upon a movement of the oil between the aforementioned chambers 33 and 34.

It is clear that the hydraulic means of coupling 22 can also be realised by only one single driving cylinder 28 that is hydraulically coupled to one single driven cylinder 29.

Figure 13:
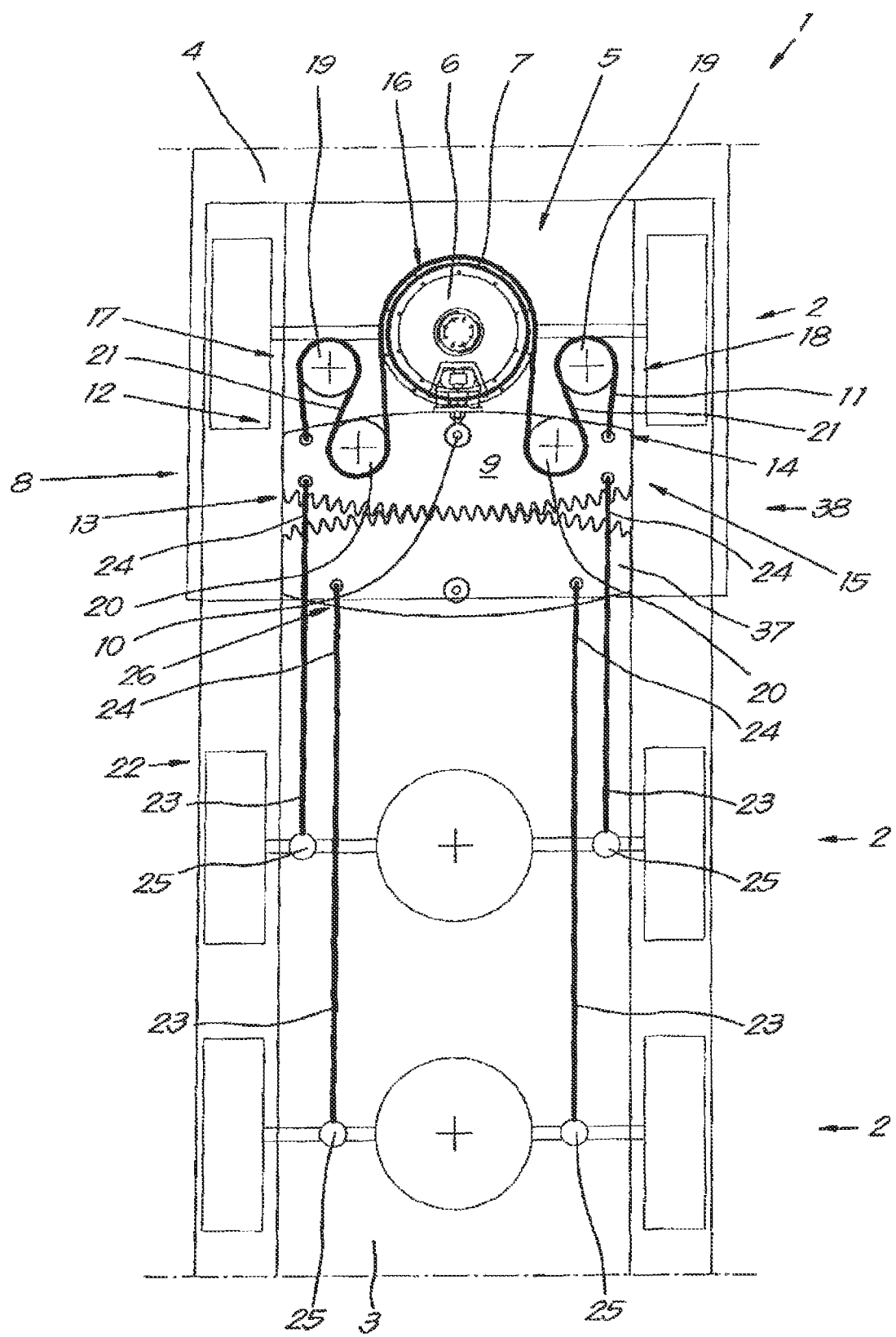
FIGS. 13 to 15 show a different embodiment of a steering mechanism according to the invention, similar to the embodiment of FIGS. 4 to 6, whereby this time the reverse mechanism is formed by a gearwheel transmission between two rockers.
Figure 14:
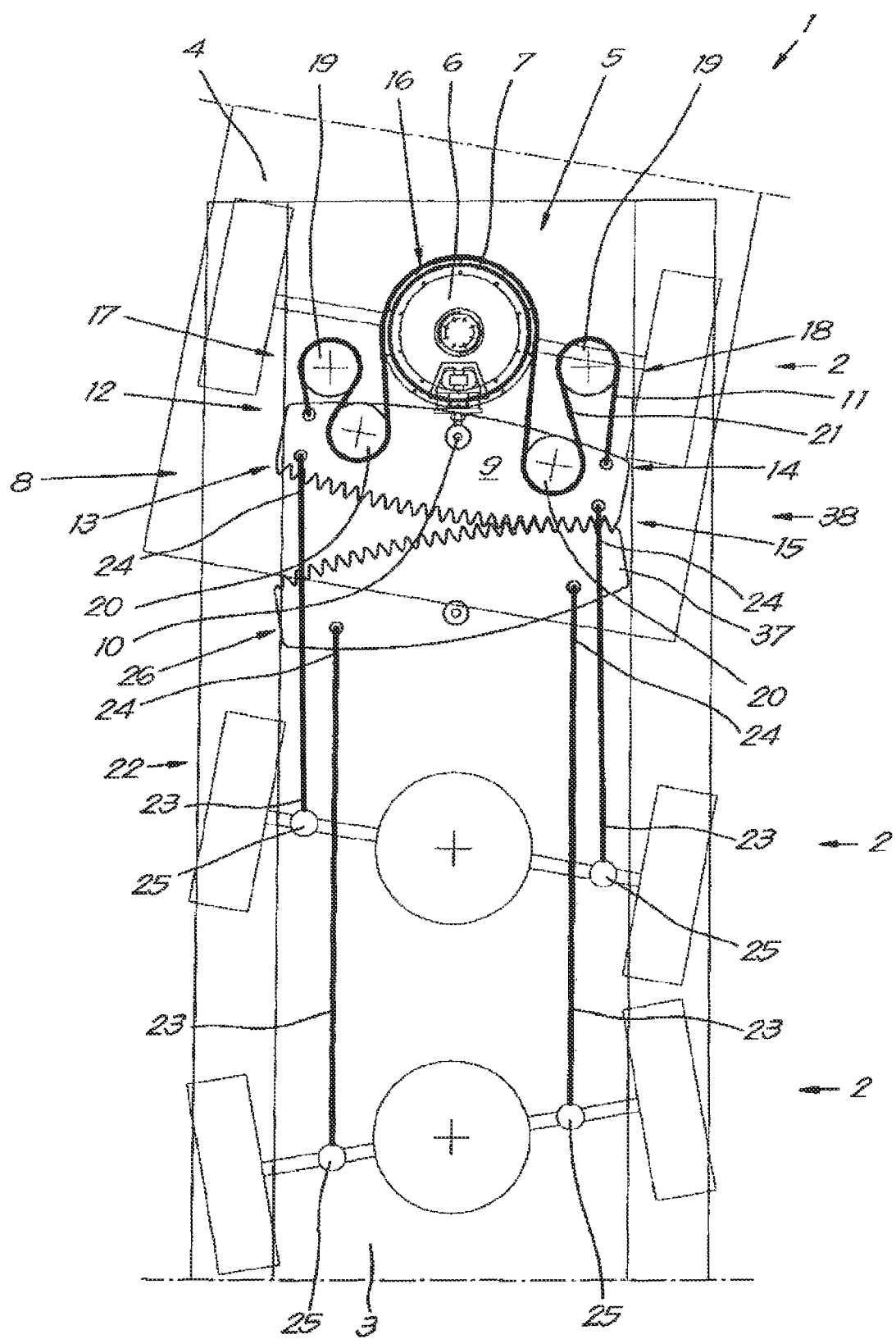
Figure 15:
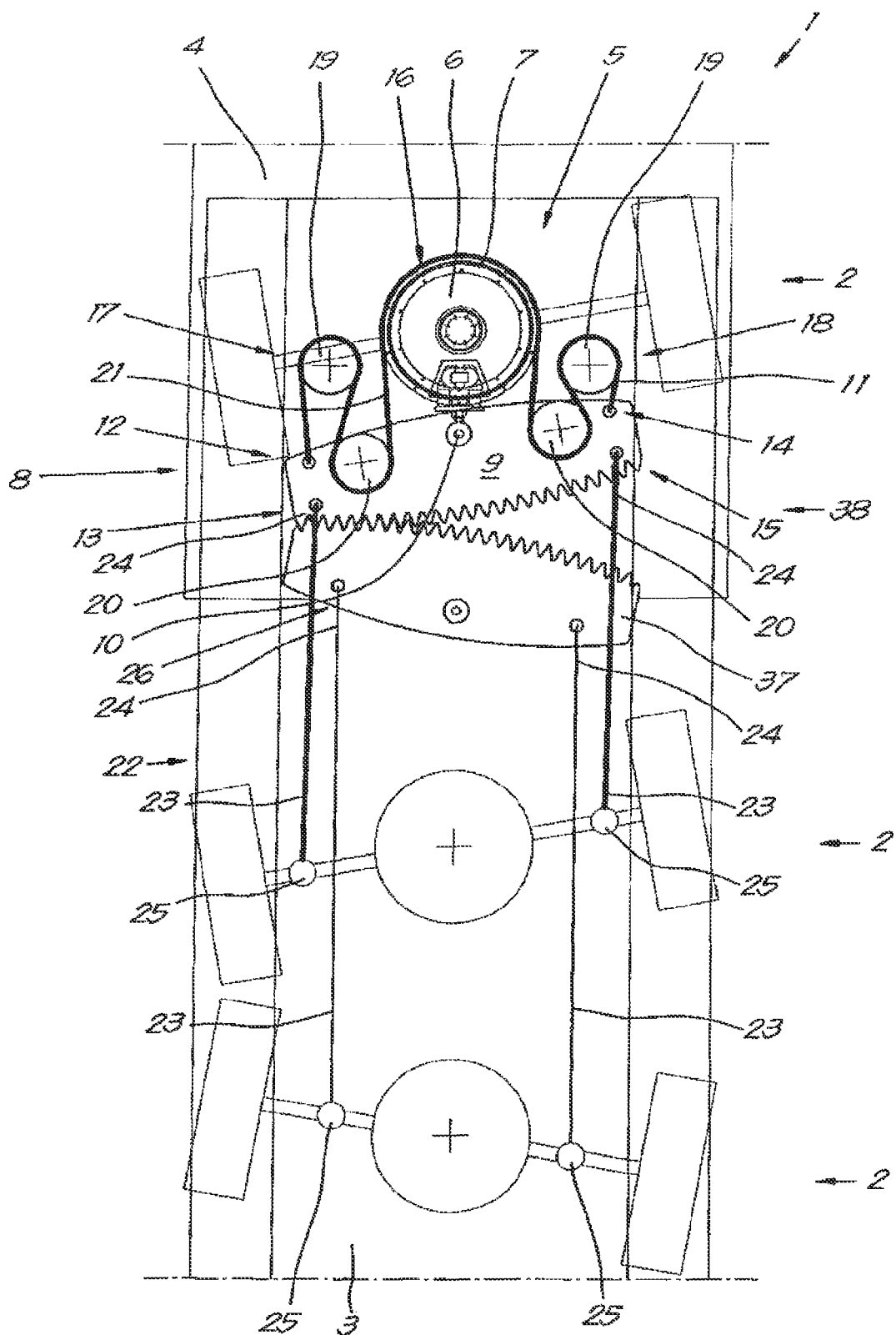

FIGS. 13 to 15 show another embodiment of a steering mechanism according to the invention, in which the steering mechanism 1 has a pair of rockers, more specifically a first rocker 9 that is coupled to the slewing bearing 5 by means of a cable 11 and which forms part of the forward coupling mechanism and a second rocker 37 that forms part of a reverse mechanism.

Here the movement of the second rocker 37 is coupled to the movement of the first rocker 9 by a reverse mechanism such that in the event of a turn of the first rocker 9 in a certain direction, the second rocker 37 undergoes a turn in the opposite direction.

In the embodiment shown in FIGS. 13 to 15, the reverse mechanism by which the first rocker 9 is coupled to the second rocker 37 is formed by a gearwheel transmission 38 between the first rocker 9 and the second rocker 37.

Moreover, the first rocker 9 is coupled to a front axle 2 to be steered by two parallel cables 23, while the second rocker 37 is coupled to a rear axle 2 to be steered, also by means of two parallel cables 23.

Figure 4:
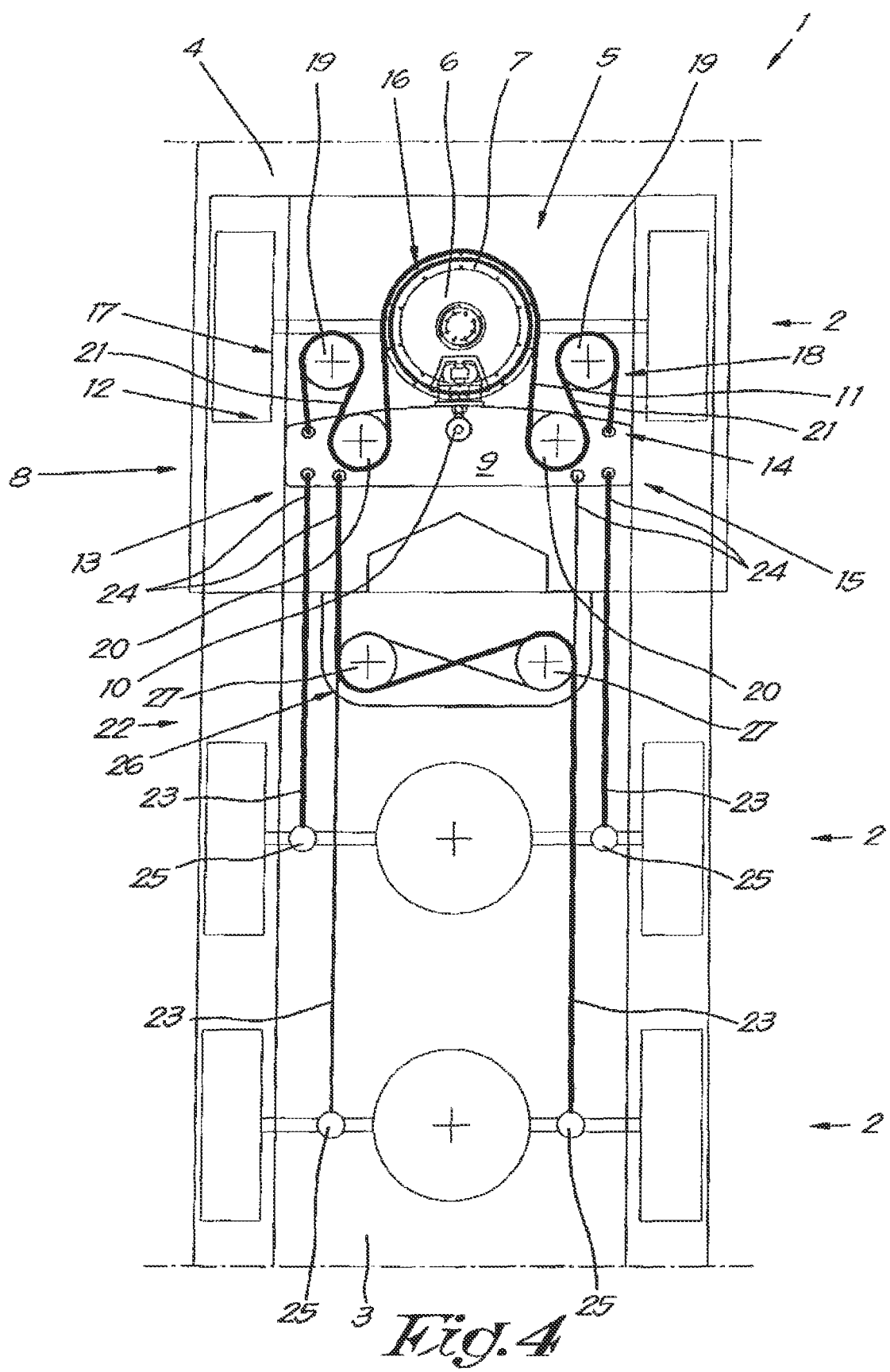
FIGS. 4 to 6 show, in a similar way to FIGS. 1 to 3, a different embodiment of a steering mechanism according to the invention in different states, whereby the steering mechanism has both a forward coupling mechanism and a reverse mechanism for steering two axles in opposite directions.

It is clear that the resulting steering of the front axle 2 and the rear axle 2 of a steering mechanism 1 in accordance with this last embodiment completely corresponds to the steering of the embodiment of a steering mechanism 1 in accordance with FIGS. 4 to 6.

An advantage of this last embodiment is however that there are no crossed cables 23.

Figure 16:
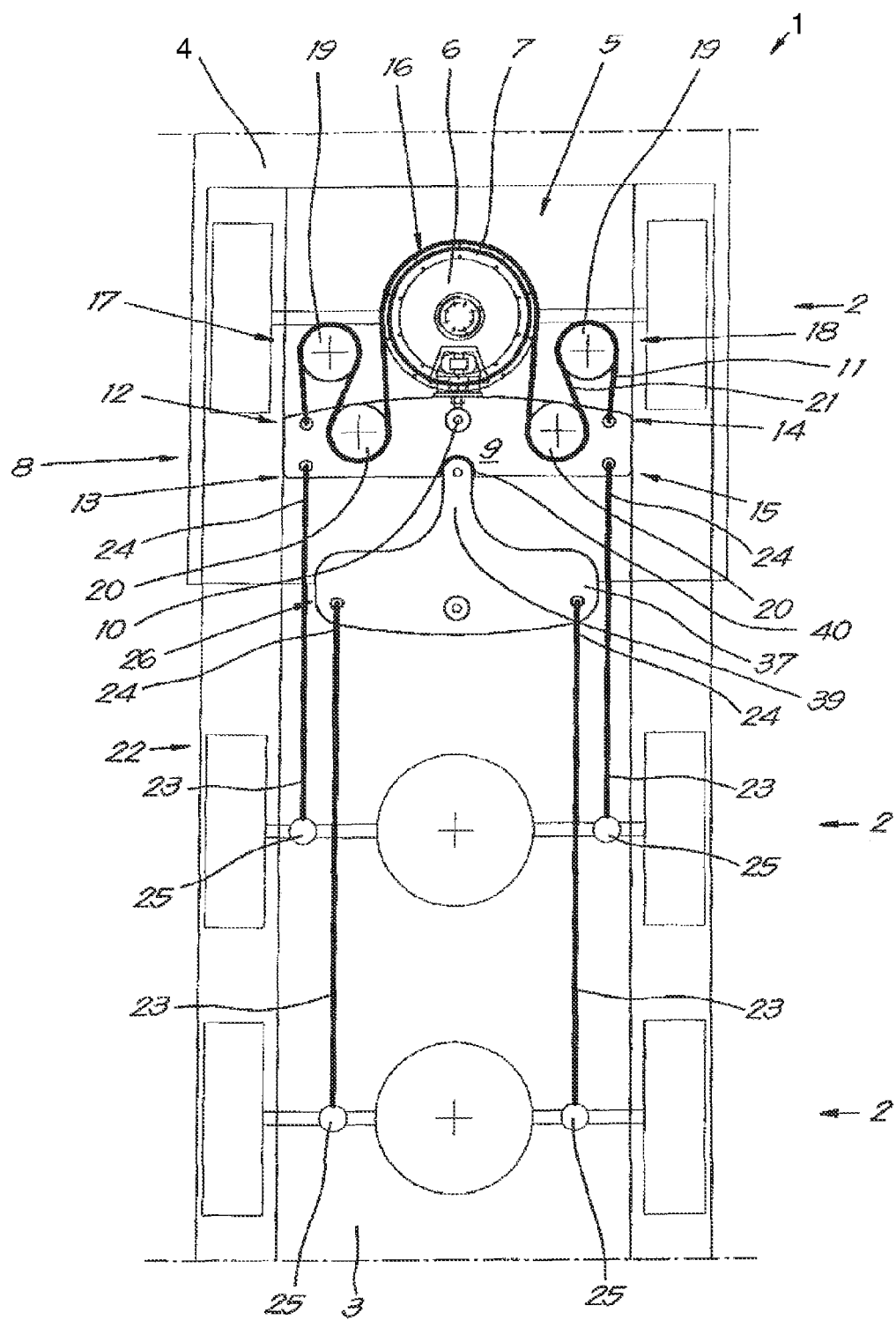
FIGS. 16 to 18 show a different embodiment of a steering mechanism according to the invention, similar to the embodiment of FIGS. 13 to 15, whereby the reverse mechanism is constructed differently.
Figure 17:
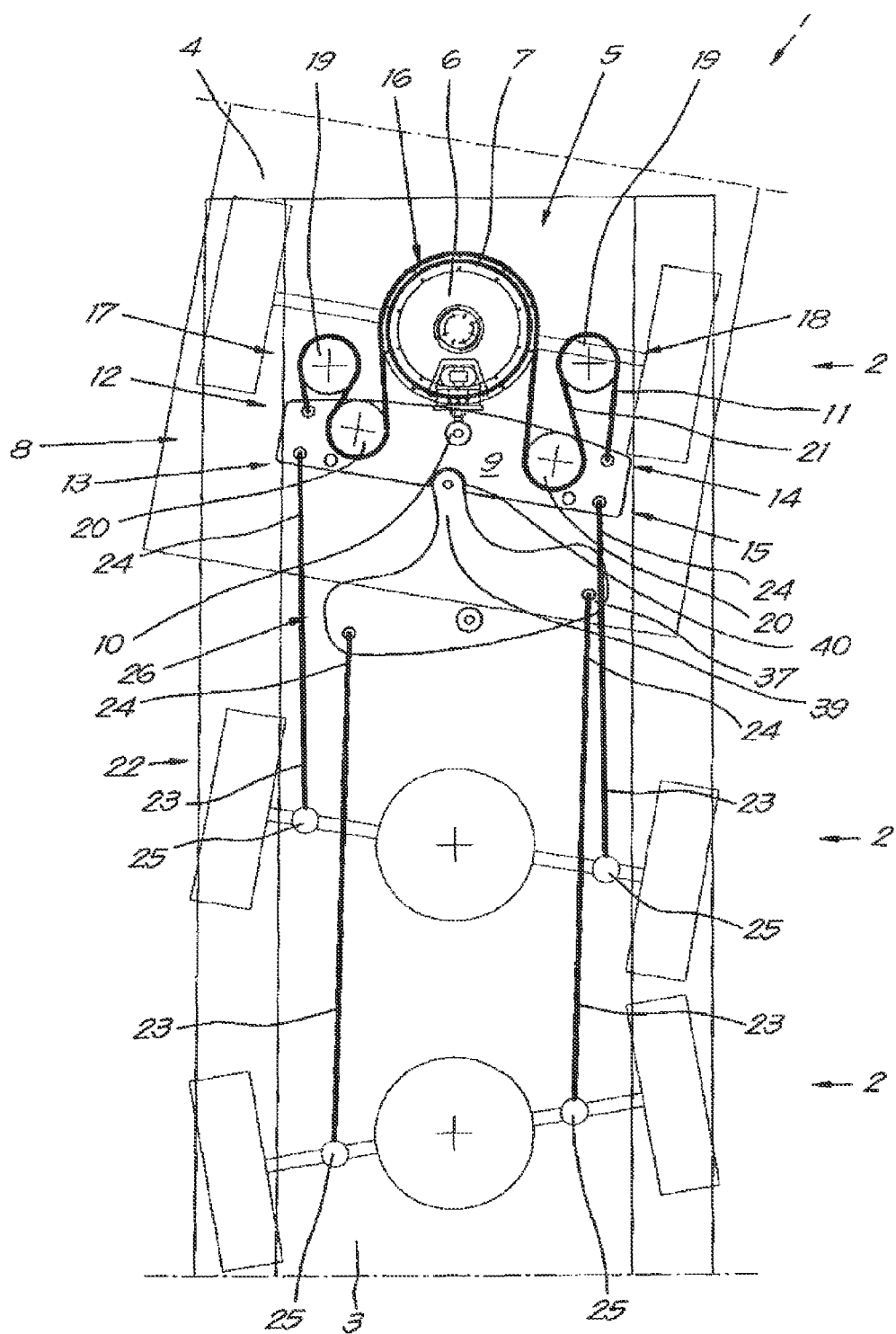
Figure 18:
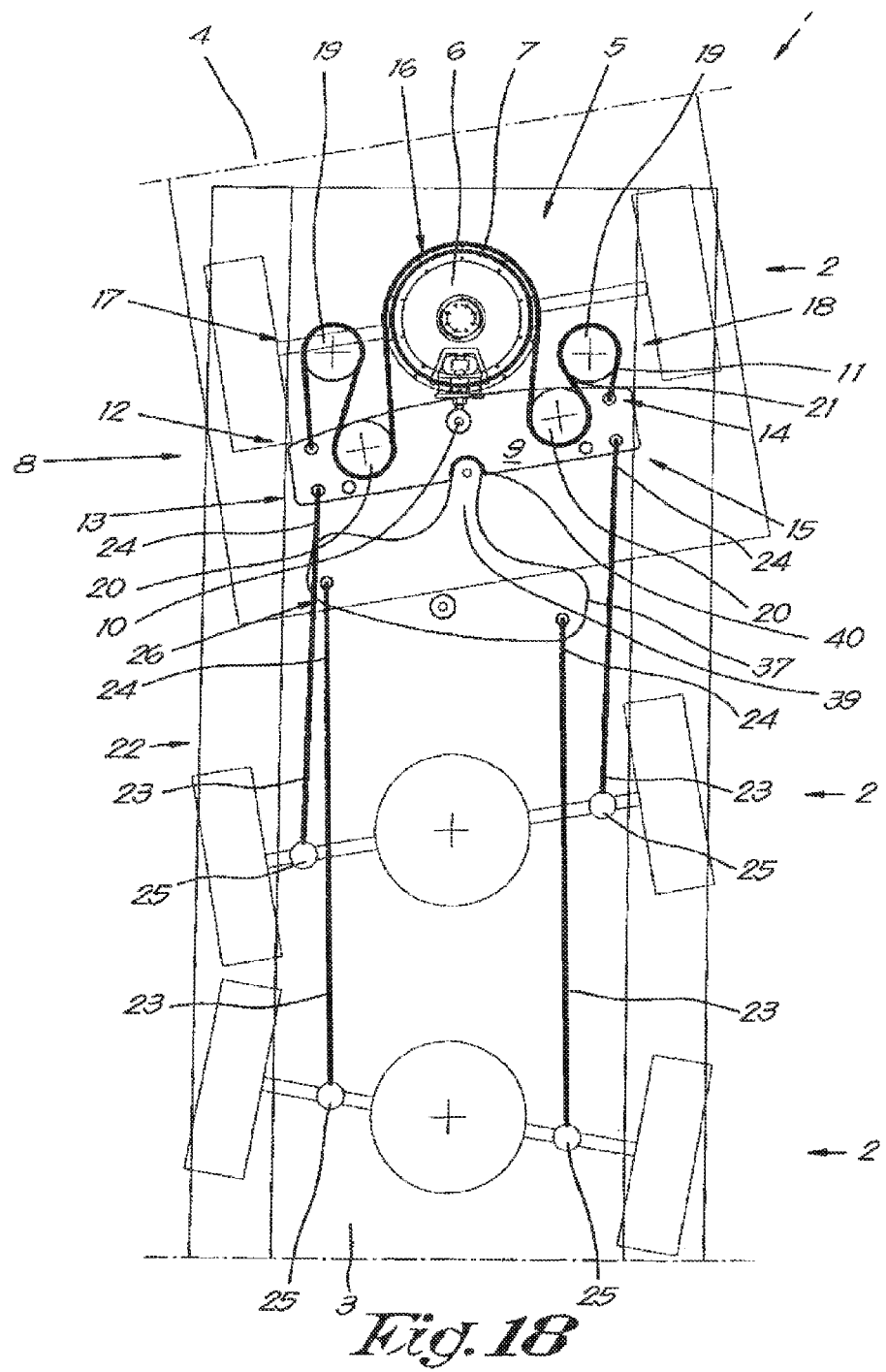

FIGS. 16 to 18 show an alternative embodiment of a steering mechanism 1 according to the invention in which there is also a second rocker 37, but where the reverse mechanism by which the first rocker 9 is coupled to the second rocker 37 is formed by a pin 39 that it is provided on one of the rockers, in this case the second rocker 37, and which mates with a groove or hole 40 provided in the other rocker, in this case the first rocker 9.

The configuration of this embodiment of a steering mechanism 1 according to the invention is, moreover, completely analogous to the embodiment of FIGS. 12 to 15 and thus requires no further comment.

In all the embodiments of a steering mechanism 1 according to the invention discussed so far, one axle 2 or a maximum of two axles 2 have been steered.

Of course, according to the invention it is not ruled out that these configurations can be expanded to steer a number of turnable axles 2, whether or not in combination with one or more fixed axles.

According to the invention it is possible, for example, to couple a number of turnable steered axles 2 to a first rocker 9 and possibly a number of other axles to a second rocker 37, for example by hydraulic means of coupling 22, whereby these turnable steered axles 2 have a driven double-acting cylinder 28 between the axle 2 concerned and the drawn vehicle 3, and whereby each aforementioned driven double-acting cylinder 28 is driven via hydraulic pipes 35 and 36 by a corresponding driving double-acting cylinder 28 affixed between the rocker 9 or 27 concerned and the drawn vehicle 3.

In an analogous way, cables 23 or chains or a rod or rods can of course be used to couple a number of axles 2 to the control 8.

Figure 19:
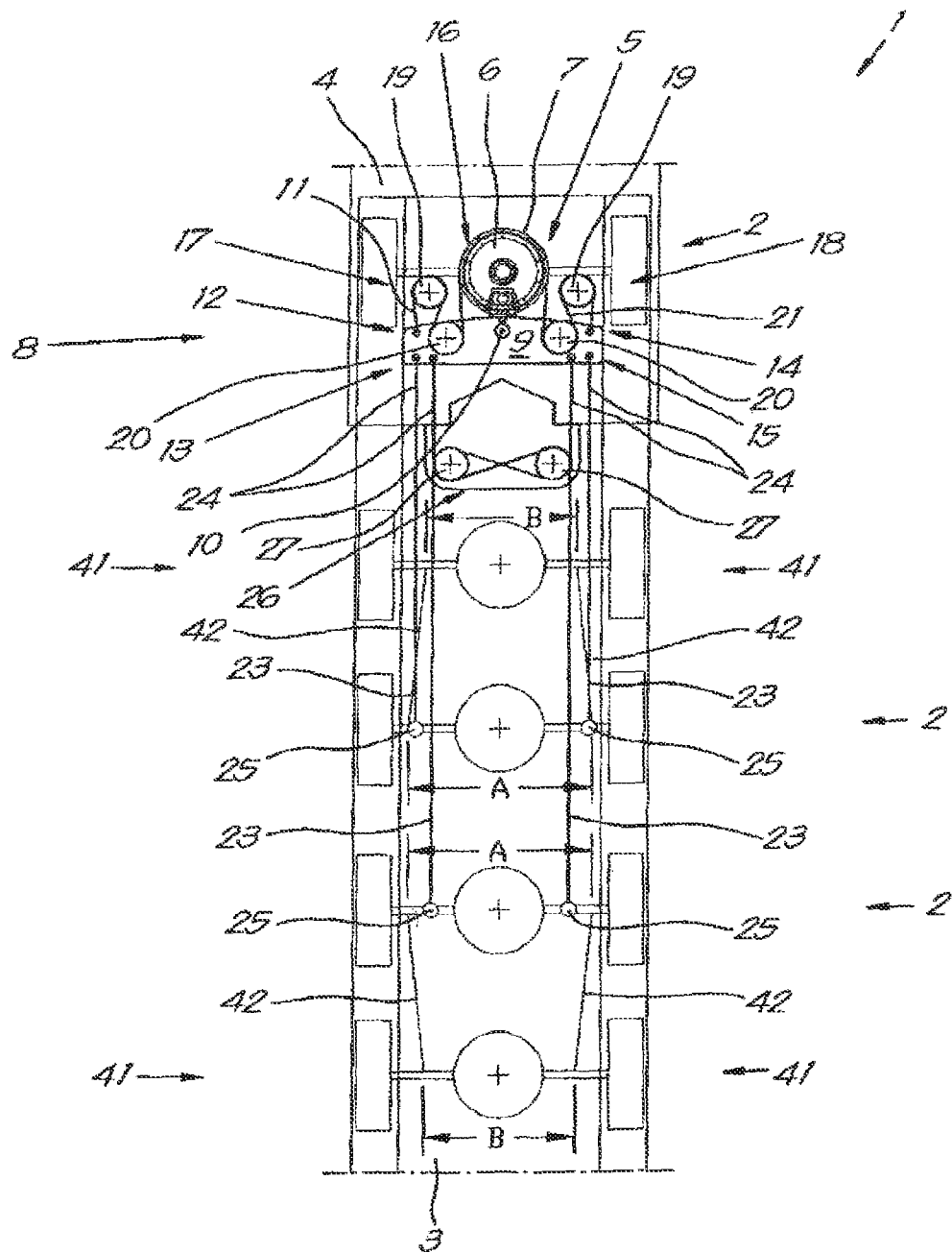
FIGS. 19 to 21 show, in a similar way, a different embodiment of a steering mechanism according to the invention, whereby this time four axles are steered, two of which directly and two indirectly.
Figure 20:
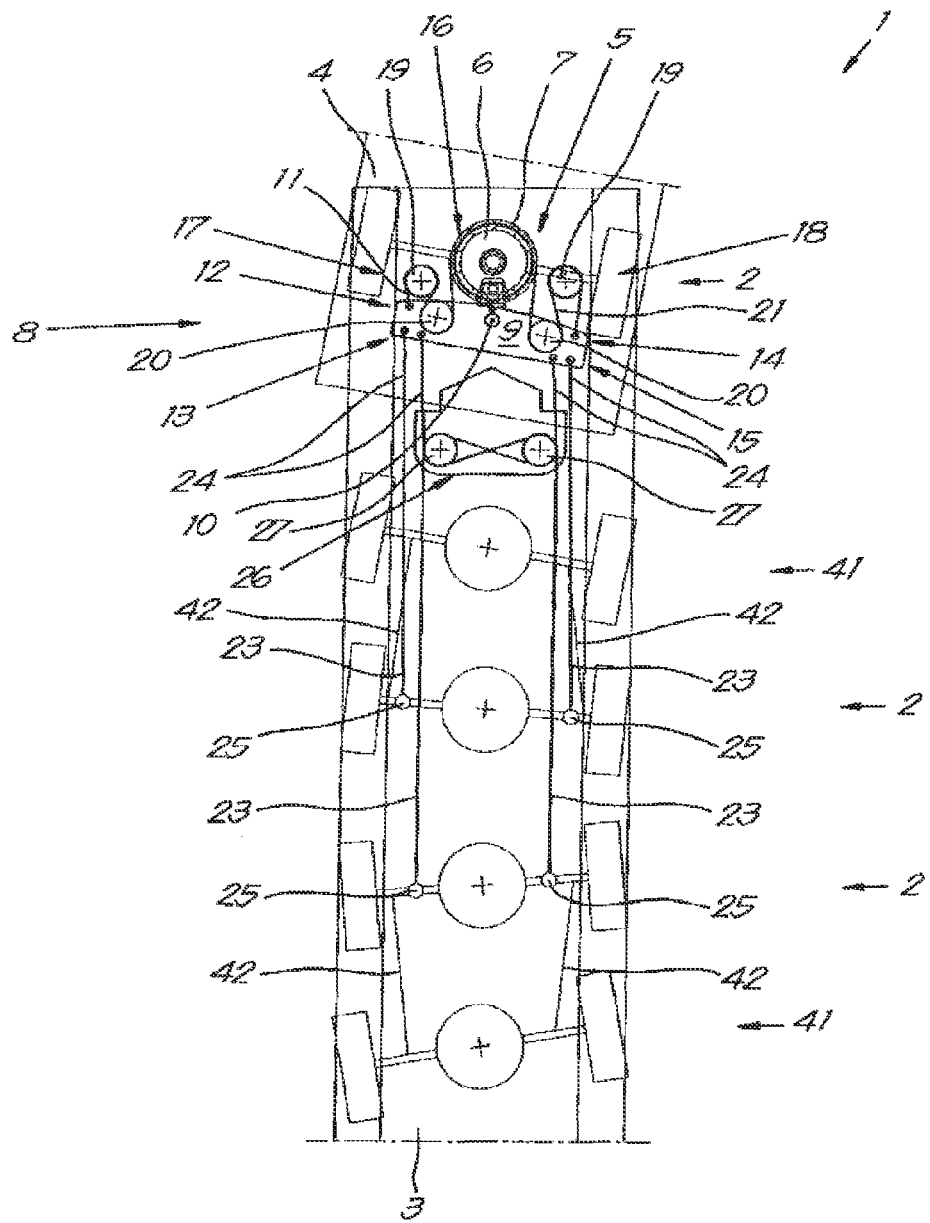
Figure 21:
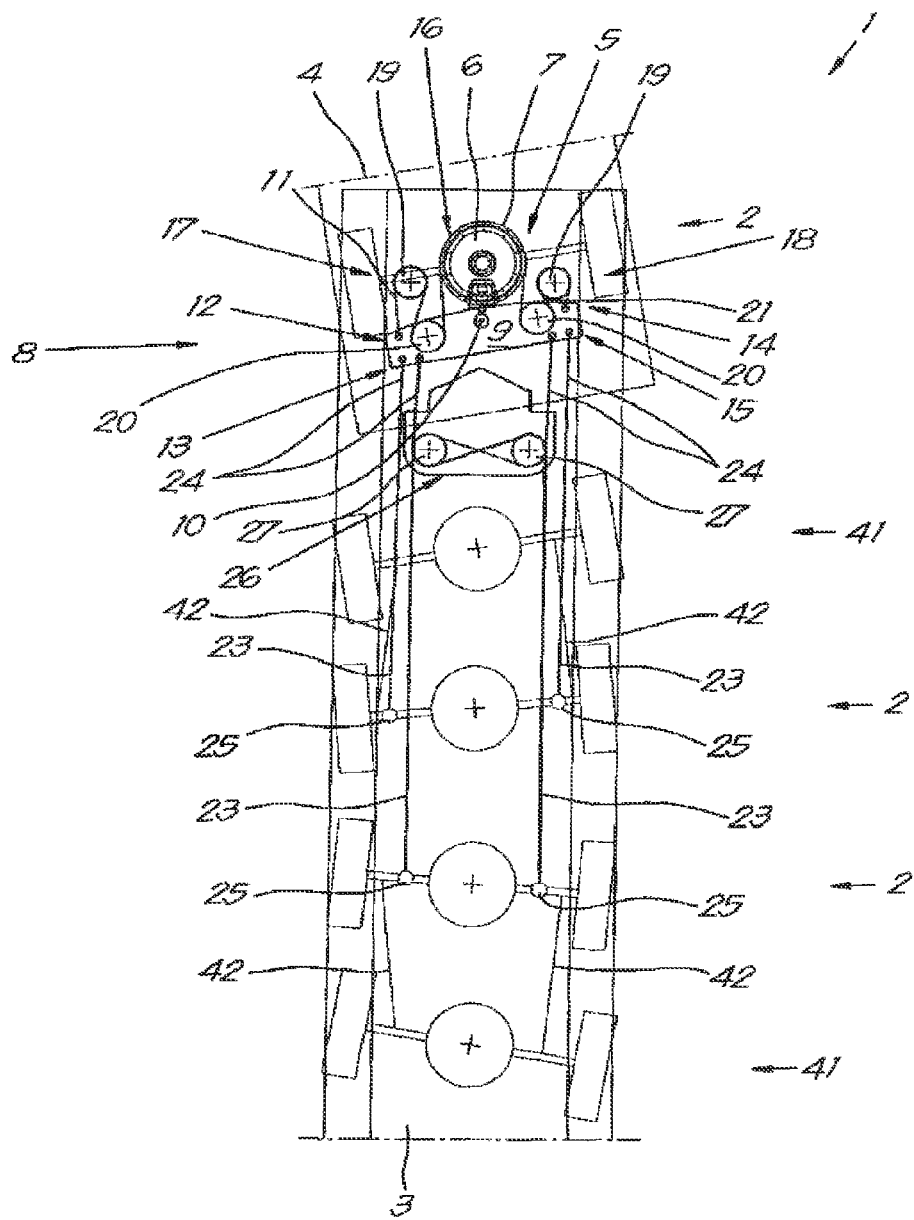

A further interesting embodiment of a steering mechanism 1 according to the invention is shown in FIGS. 19 to 21, in which a number of axles are steered.

Here a part of these steered axles 2 are steered directly via means of coupling 22 between the axle 2 concerned and the control 8 of the steering mechanism 1, while the remaining part of the axles are indirectly steered axles 41, that are indirectly steered by an additional coupling from the indirectly steered axle 41 concerned to a directly steered axle 2.

In the embodiment of a steering mechanism 1 according to the invention shown, there are four axles that are steered, whereby two axles 2 are steered directly and two axles 41 indirectly.

The front directly steered axle 2 is hereby coupled to a rocker 9 by a forward coupling mechanism formed by two parallel cables 23, while the rear directly steered axle 2 is steered oppositely via cable sheaves 27 and crossed cables 23.

An indirectly steered axle 41 is coupled to each of the directly steered axles 2 by two rods 42, that each have a first end coupled to a directly steered axle 2 and a second end coupled to an indirectly steered axle 41.

In many cases it is desirable for an indirectly steered axle 41 not to undergo precisely the same angular displacement as the directly steered axle 2 to which the indirectly steered axle 41 concerned is coupled, such that the wheels of the axles 2, as well as the axles 41, that are located at a different position behind the tractor unit 4, can nevertheless be lined up according to the turn to be followed.

It can thus be interesting to apply means whereby the angular displacement of a directly steered axle 2 is converted according to a certain ratio to an angular displacement of an indirectly steered axle 41 coupled to it.

Such means can for example be formed simply by making the mutual distance A between the first ends of the two rods 42 on the directly steered axle 2 different to the mutual distance B between the two ends of the two rods 42 on the indirectly steered axle 41.

However, other means according to the invention are not ruled out here.

Preferably the steering mechanism for guiding a drawn vehicle 3 with a number of steered axles 43 is designed such that, when making a turn, the steered axles 43 are steered such that the geometric axes X of the wheels of the steered axles 43 intersect or cross one another at one point C or approximately at one point, at least when seen as a vertical projection on the ground.

Preferably the point of intersection C on the geometric axis Y of at least one fixed axle 44 of the drawn vehicle 3, and preferably on a geometric axis Z of a rigid axle 44 of the tractor unit 4, coincides better or approximately coincides with the intersect of the geometric axes of the steered wheels 46 of the tractor unit 4.

In such a case the wheels of the drawn vehicle 3 approximately follow the tracks of the wheels of the tractor unit 4, save for a small deviation. This explains why in such a case the drawn vehicle 3, when taking a bend, only deviates slightly to the outside or the inside of the bend, and why the tyres are subject to much less rubbing and twisting on the road and to much smaller sideways axial forces, with the benefits of this already described in detail.

If this principle is respected the axles 43-44 can also be further apart, for example over a distance of up to 1.85 meters without the rubbing and twisting of the tyres on the road increasing appreciably.

This means a better distribution of the load over the axles 43-44 and a more stable jack-knifing behaviour in the event of sudden braking.

It is obvious that the embodiments of a steering mechanism 1 according to the invention discussed here only serve as illustrations and that all kinds of other possible combinations and expansions to a number of axles and such, are not excluded from the invention.

FIG. 23 shows a practical developed embodiment of a steering mechanism 1 according to the invention that is at least partially constructed as a package or cassette for fitting on a drawn vehicle 3, and to this end has a housing 47 in which there is at least the slewing bearing 5 and the control 8, as well as the tackles 17 and 18.

The aim of such an embodiment of a steering mechanism 1 according to the invention is of course to make the installation of it as simple as possible.

By extension, the housing 47 can for example also have the aforementioned cable sheaves 27 or a second rocker 37 and such.

The present invention is not in any way limited to the embodiments of a steering mechanism 1 described as an example and shown in the drawings, but a steering mechanism 1 according to the invention can be realised in all kinds of forms and dimensions, without acting outside the scope of the invention.

The various versions of semitrailers shown in FIGS. 24 to 37 that differ from one another in the number of axles 43-43, both fixed and steered axles, in the drive of the steered axles 44, whether with rods, cables, chains or hydraulically, in the driving direction of the steered axles 44 when there are a number of them, whether in the same steering direction or in the opposite steering direction.

What the versions all have in common is that the steering mechanism is in the form of a cassette, with or without an extra reverse mechanism.

The invention claimed is:

1. A steering mechanism (1) of a drawn vehicle (3) for steering one or more turnable steered axles (2,41) of the drawn vehicle (3) by the mutual bending movement between the drawn vehicle and the towing vehicle or tractor unit when making a turn, the steering mechanism comprising:
    a slewing bearing (5) with a first slewing bearing part (6) and a second slewing bearing part (7) that are turnable with respect to one another, wherein the first slewing bearing part (6) is configured to be coupled to the drawn vehicle (3) and the second slewing bearing part (7) is configured to be coupled to a tractor unit (4);
    a control (8) for steering the axles (2) including a rocker (9) and a support that are configured to be coupled to the drawn vehicle (3), wherein the support at least contains a vertical shaft (10) around which the rocker (9) is rotatably affixed;

a cable (11) having a first end (12) connected to a first side (13) of the rocker (9) and a second end (14) connected to a second side (15) of the rocker (9), wherein the vertical shaft (10) of the control (8) is located between the first side (13) and the second side (15) of the rocker (9), and an interjacent part (16) of the cable (11) is affixed around the second bearing part (7) to transmit a turn of the second slewing bearing part (7) to a turn of the rocker (9); and a tackle (17,18) at each end (12,14) of the cable (11), including two or more pulleys (19,20), where at least one pulley (19) of each tackle (17,18) is configured to be coupled to the drawn vehicle (3), and at least one pulley (20) of each tackle (17,18) is on the rocker (9), and where a part (21) of the cable (11) between each end (12,14) and an interjacent part (16) of the cable (11) is guided over the pulleys (17,18) of the tackle concerned (17,18).

2. A steering mechanism (1) according to claim 1, wherein the tackle (17,18) of each end (12,14) of the cable (11) includes one movable pulley (20) and one fixed pulley (19), wherein the fixed pulleys (19) are placed on either side of the slewing bearing (5) and the movable pulleys (20) are on the rocker (9) between the ends (12,14) of the cable (11) and the vertical shaft (10) of the rocker (9), and whereby the cable (11) is guided from one end (12,14) over the fixed pulley (19) to that one end (12,14) and then around the movable pulley (20) of that one end (12,14) to the slewing bearing (5).

3. A steering mechanism (1) according to claim 1, further comprising a means of coupling (22) to transmit a turn of the rocker (9) to a turn of one or more turnable steered axles (2).

4. A steering mechanism (1) according to claim 3, wherein the coupling means (22) at least partially includes a direct mechanical coupling from the control to a turnable steered axle (2) by a pair of cables (23) or chains, and a rod or rods that are each secured at one end (24) to the rocker (9) and at another end (25) to the turnable steered axle concerned (2).

5. A steering mechanism (1) according to claim 3, wherein the coupling means (22) are at least partially hydraulic means of coupling (22) that at least includes:

a driving double-acting cylinder (28) that is mounted between the rocker (9) and the drawn vehicle (3);

a driven double-acting cylinder (29) driven by the driving double-acting cylinder (28) that is mounted between a turnable steered axle (2) and the drawn vehicle (3);

a hydraulic pipe (35) between a first chamber (33) of the driving double-acting cylinder (28) and a first chamber (33) of the driven double-acting cylinder (29); and, a hydraulic pipe (36) between a second chamber (34) of the driving double-acting cylinder (28) and a second chamber (34) of the driven double-acting cylinder (29).

6. A steering mechanism (1) according to claim 5, wherein the steering mechanism includes a plurality of turnable steered axles (2) that are coupled to the rocker (9) by the coupling means (22), whereby these turnable steered axles (2) have a driven double-acting cylinder (29) between the axle (2) concerned and the drawn vehicle (3), and where each driven double-acting cylinder (29) is driven via hydraulic pipes (35, 36) by a corresponding driving double-acting cylinder (28) affixed between the rocker (9) and the drawn vehicle (3).

7. A steering mechanism (1) according to claim 3, wherein the coupling means (22) at least partially includes a forward coupling mechanism, such that a turn of the rocker (9) in a certain direction causes one or more turnable steered axles (2) to undergo a turn in the same direction.

8. A steering mechanism according to claim 7, wherein the coupling means (22) have a reverse mechanism such that when the rocker (9) turns in a certain direction, one or more turnable steered axles (2) undergo a turn in the opposite direction to the turning direction of the rocker (9).

9. A steering mechanism (1) according to claim 8, wherein the reverse mechanism includes hydraulic pipes (35,36) between a driving double-acting cylinder (28) and a driven double-acting cylinder (29) being connected to respective chambers (33,34) and the driving double-acting cylinder (28) and driven double-acting cylinder (29) being positioned such that a turn of the rocker (9) results in a turn of the one or more turnable steered axles (2) in the opposite direction.

10. A steering mechanism (1) according to claim 8, wherein the coupling means (22) are at least partially formed by a pair of cables (23) and that the reverse mechanism contains at least two cable sheaves (27) in order to guide both cables (23), and such that the cables (23) are mutually crossed.

11. A steering mechanism (1) according to claim 8, wherein the steering mechanism (1) has a pair of rockers (9,37), including a first rocker (9) that is coupled to the slewing bearing (5) by means of a cable (11) and which forms part of the forward coupling mechanism and a second rocker (37) that forms part of the reverse mechanism, whereby the movement of the second rocker (37) is coupled to the movement of the first rocker (9) by the reverse mechanism such that with a turn of the first rocker (9) in a certain direction, the second rocker (37) undergoes a turn in the opposite direction.

12. A steering mechanism (1) according to claim 11, wherein the reverse mechanism with which the first rocker (9) is coupled to the second rocker (37) is formed by a gearwheel transmission (38) between the first rocker (9) and the second rocker (37).

13. A steering mechanism (1) according to claim 11, wherein the reverse mechanism with which the first rocker (9) is coupled to the second rocker (37) includes a pin (39) that is provided on one of the rockers (37) and which mates with a groove or hole (40) provided in the other rocker (9).

14. A steering mechanism (1) according to claim 7, wherein the forward coupling mechanism includes hydraulic pipes (35,36) between a driving double-acting cylinder (28) and a driven double-acting cylinder (29) being connected to respective chambers (33,34), and the driving double-acting cylinder (28) and driven double-acting cylinder (29) being positioned such that a turn of the rocker (9) results in a turn of the one or more turnable steered axles (2) in the same direction.

15. A steering mechanism (1) according to claim 1, wherein the steering mechanism includes a plurality of steered axles (2,41), wherein some of these steered axles (2) are steered directly via coupling means (22) between the axle concerned (2) and the control (8) of the steering mechanism (1), while the remaining part of the axles (41) are steered indirectly by an additional coupling (42) from an indirectly steered axle concerned (41) to a directly steered axle (2).

16. A steering mechanism (1) according to claim 15, wherein an additional coupling includes two rods (42) that each have a first end coupled to a directly steered axle (2) and a second end to an indirectly steered axle (41).

17. A steering mechanism (1) according to claim 16, wherein a distance (A) between the first ends of the two rods differs from a distance (B) between the second ends of the two rods (42).

18. A steering mechanism (1) according to claim 1, wherein the steering mechanism is at least partially constructed as a package or cassette for mounting on a drawn vehicle (3) and has a housing (43) in which there is at least the slewing bearing (5), the control (8), and the tackles (17,18).

19. A steering mechanism (1) according to claim 1 for steering a drawn vehicle with a number of steered axles, wherein the steering mechanism is configured such that when making a turn the steered axles are steered such that geometric axes of wheels of the steered axles intersect one another at one point or approximately at one point.

20. A steering mechanism (1) according to claim 19 for steering a drawn vehicle with a plurality of steered axles and at least one fixed axle, wherein the steering mechanism is configured such that when making a turn the steered axles are steered such that the geometric axes of the wheels of the steered axles intersect one another at one point or approximately at one point that is located on the geometric axis of at least one fixed axle.

21. A steering mechanism (1) according to claim 19, wherein the steering mechanism is configured such that when making a turn, the point is located on a geometric axis of a rigid axle of the tractor unit.

22. A steering mechanism (1) according to claim 19, wherein the steering mechanism is configured such that when making a turn the point coincides or approximately coincides with the intersection of the geometric axes of the wheels of the steered axles.

* * * * *